(12) United States Patent
Otsuka et al.

(10) Patent No.: US 12,139,618 B2
(45) Date of Patent: Nov. 12, 2024

(54) SILICON-CONTAINING OXIDE-COATED ALUMINUM NITRIDE PARTICLE AND METHOD OF MANUFACTURING THE SAME

(71) Applicant: SHOWA DENKO K.K., Tokyo (JP)

(72) Inventors: Yuki Otsuka, Yokohama (JP); Hidetoshi Okamoto, Yokohama (JP); Naoki Minorikawa, Yokohama (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 17/855,481

(22) Filed: Jun. 30, 2022

(65) Prior Publication Data

US 2022/0363912 A1    Nov. 17, 2022

Related U.S. Application Data

(63) Continuation of application No. 17/270,202, filed as application No. PCT/JP2019/033159 on Aug. 23, 2019, now Pat. No. 11,396,602.

(30) Foreign Application Priority Data

Aug. 24, 2018  (JP) .................................. 2018-157563
May 21, 2019   (JP) .................................. 2019-095576

(51) Int. Cl.
C09C 3/12 (2006.01)
C09C 1/40 (2006.01)
(52) U.S. Cl.
CPC . C09C 3/12 (2013.01); C09C 1/40 (2013.01)
(58) Field of Classification Search
CPC .................................. C09C 3/12; C09C 1/40
See application file for complete search history.

(56) References Cited

U.S. PATENT DOCUMENTS 5,234,712 A    8/1993  Howard
6,054,220 A    4/2000  Mroz
6,423,373 B1   7/2002  Kim et al.

FOREIGN PATENT DOCUMENTS

| JP | 04-321506 A | 11/1992 |
| JP | 07-507760 A | 8/1995 |
| JP | 07-315813 A | 12/1995 |
| JP | 11-116213 A | 4/1999 |
| JP | 2001-019575 A | 1/2001 |
| JP | 3446053 B2 | 9/2003 |

(Continued)

OTHER PUBLICATIONS

International Search Report of PCT/JP2019/033159 dated Oct. 8, 2019 [PCT/ISA/210].

(Continued)

*Primary Examiner* — Pegah Parvini
(74) *Attorney, Agent, or Firm* — Sughrue Mion, PLLC

(57) ABSTRACT

A silicon-containing oxide-coated aluminum nitride particle including an aluminum nitride particle and a silicon-containing oxide coating covering the surface of the aluminum nitride particle. The content of carbon atoms is less than 1000 ppm by mass, and an Si/Al atom ratio of the surface as measured by AES analysis is 0.29 or more and 5.0 or less. In another aspect, the coverage of the silicon-containing oxide coating covering the surface of the aluminum nitride particle as measured by LEIS analysis is 15% or more and 100% or less.

4 Claims, 5 Drawing Sheets

(56) References Cited

FOREIGN PATENT DOCUMENTS

| JP | 2004083334 A | * | 3/2004 |
| JP | 2005-104765 A | | 4/2005 |
| JP | 4088768 B2 | | 5/2008 |
| JP | 4804023 B2 | | 10/2011 |
| JP | 2015-071730 A | | 4/2015 |

OTHER PUBLICATIONS

Notice of Reasons for Rejection issued to JP Application No. 2019-564117 dated Jan. 8, 2020.
K.Tsugeki, et al. "Silica coating of aluminium nitride particles by radio-frequency plasma chemical vapour deposition", Journal of Materials Science Letters, 1994, vol. 13, pp. 43-45 (3 pages).
Extended European Search Report dated Feb. 27, 2024 in Application No. 23188259.8.

* cited by examiner

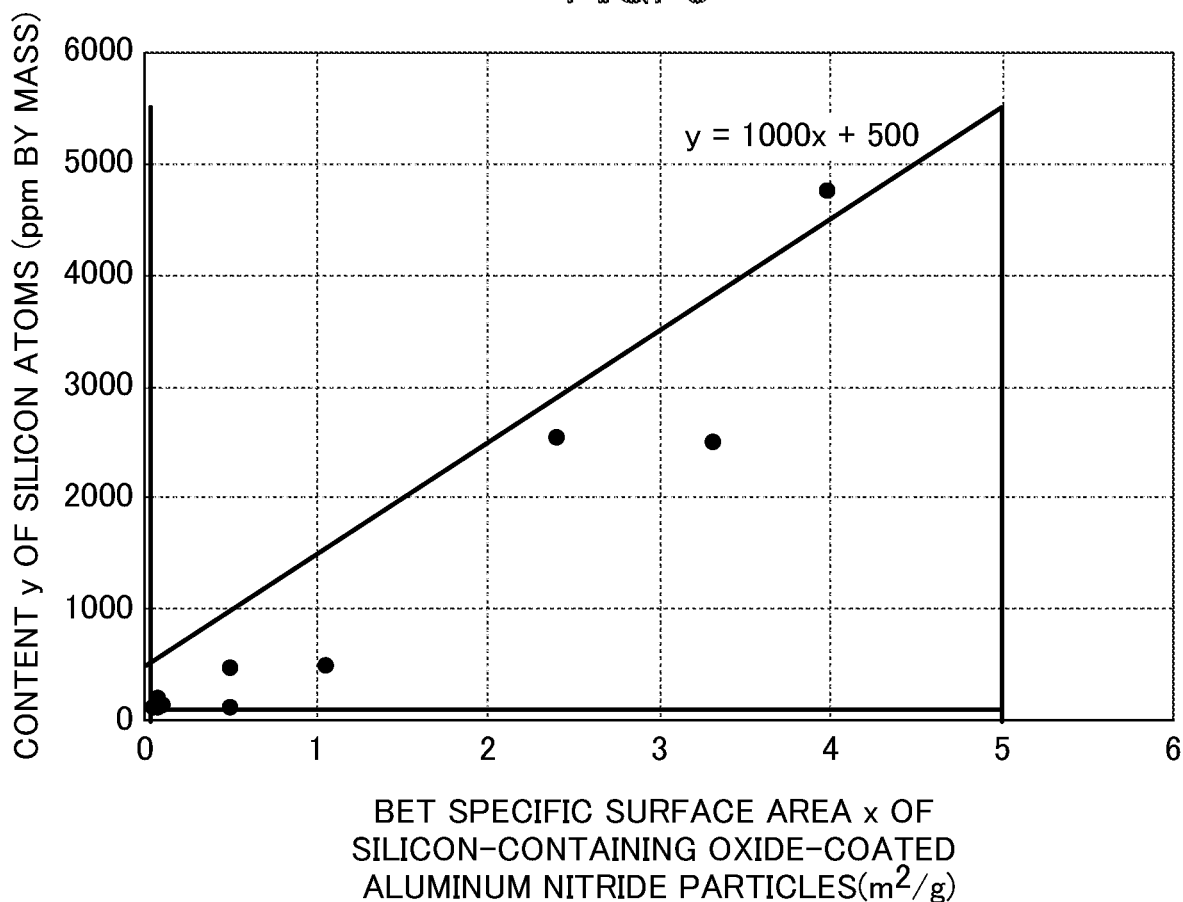

SILICON-CONTAINING OXIDE-COATED ALUMINUM NITRIDE PARTICLE AND METHOD OF MANUFACTURING THE SAME

CROSS-REFERENCE TO RELATED APPLICATIONS

This application is a Rule 53(b) Continuation of U.S. application Ser. No. 17/720,202 filed Feb. 22, 2021, which is a National Stage of International Application No. PCT/JP2019/033159 filed Aug. 23, 2019, which claims priority based on Japanese Patent Application No. 2018-157563 filed Aug. 24, 2018 and Japanese Patent Application No. 2019-095576 filed May 21, 2019, the respective disclosures of which are incorporated herein by reference in their entirety.

TECHNICAL FIELD

The present invention relates to a silicon-containing oxide-coated aluminum nitride particle and a method of manufacturing the silicon-containing oxide-coated aluminum nitride particle, and also relates to a method of manufacturing a heat dispersing resin composition containing the silicon-containing oxide-coated aluminum nitride particle.

BACKGROUND ART

Aluminum nitride has high thermal conductivity and excellent electrical insulating properties. This makes aluminum nitride to be a promising material as a filler in a resin composition used for those products such as heat dispersing sheets (heat dissipation sheets) and sealing agents for electronic parts. However, aluminum nitride may undergo hydrolysis upon reacting with moisture, resulting in denaturization into aluminum hydroxide which has low thermal conductivity. The hydrolysis of aluminum nitride may also generate ammonia which is corrosive.

The hydrolysis of aluminum nitride may even be promoted in the presence of atmospheric moisture. Under conditions of high temperature and high humidity, aluminum nitride-containing products therefore, may suffer from not only decrease in moisture resistance and/or thermal conductivity but also corrosion due to ammonia generated by the hydrolysis of aluminum nitride. These may result in deteriorated performance.

Technologies for improving aluminum nitride in terms of moisture resistance have been proposed, including: a method involving forming a layer consisting of Si—Al—O—N on the surface of aluminum nitride powder (for example, see Patent Document 1); a method involving forming a coating layer on the surface of aluminum nitride powder with a silicate treatment agent and a coupling agent (for example, see Patent Document 2); a method in which treatment is performed with a silicate treatment agent for leaving an organic group on the surface of aluminum nitride powder (for example, see Patent Document 3); a method in which the surface of an aluminum nitride particle is surface-modified using a specific acidic phosphate ester (for example, see Patent Document 4); and the like.

In the moisture-proof aluminum nitride powder described in Patent Document 1, a layer of silicate ester is applied on the surface of aluminum nitride powder, and then calcination is performed at a high temperature of 350 to 1000° C. to form a layer consisting of Si—Al—C—N on the surface. In the aluminum nitride-based powder described in Patent Document 2, surface treatment is performed with a silicate treatment agent and a coupling agent, and high-temperature heat treatment is then performed to form a coating layer on a surface. In the aluminum nitride powder described in Patent Document 3, surface treatment is performed with a silicate treatment agent, and heat treatment is then performed at a temperature not more than 90° C. to leave an organic group. This may improve conformability with a resin. In the surface-modified particle described in Patent Document 4, an aluminum nitride particle is surface-modified with a specific acidic phosphate ester to improve moisture resistance.

Patent Document 1: Japanese Patent No. 3446053

Patent Document 2: Japanese Patent No. 4088768

Patent Document 3: Japanese Patent No. 4804023

Patent Document 4: Japanese Unexamined Patent Application, Publication No. 2015-71730

DISCLOSURE OF THE INVENTION

Problems to be Solved by the Invention

Nonetheless, conventional technologies suffer from the following problems. The aluminum nitride powders as described above have a reactive layer of Si—Al—O—N, a coating layer formed with a silicate treatment agent and a coupling agent, a surface-modified layer, or the like in order to improve moisture resistance. As a result, moisture resistance has not been improved to a sufficient level albeit some degree of improvement has been shown. Rather, a coating used as a mean for improving moisture resistance often decreases the thermal conductivity of the original aluminum nitride. Disadvantageously, it is also difficult for them to be blended with various materials at a high filling rate when used as fillers.

The present invention is made in order to solve the aforementioned problems. An object of the present invention is to provide a method of manufacturing a silicon-containing oxide-coated aluminum nitride particle, the method being capable of manufacturing a silicon-containing oxide-coated aluminum nitride particle having improved moisture resistance in which high thermal conductivity inherent to an aluminum nitride particle is maintained; a method of manufacturing a heat dispersing resin composition containing the silicon-containing oxide-coated aluminum nitride particle; and the silicon-containing oxide-coated aluminum nitride particle.

Means for Solving the Problems

After extensive studies, the present inventors found that coating an aluminum nitride particle with a specific organic silicone compound in accordance with a specific method can solve the aforementioned problems. Then the present invention has been completed. That is, the present invention can be implemented in the following ways.

[1] A method of manufacturing a silicon-containing oxide-coated aluminum nitride particle including an aluminum nitride particle and a silicon-containing oxide coating covering the surface of the aluminum nitride particle, the method comprising:

a first step of covering the surface of the aluminum nitride particle with an organic silicone compound including a structure represented by the following formula (1):

[Chem. 1]

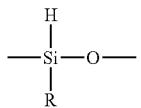
(1)

wherein in the formula (1), R is an alkyl group having a carbon number of 4 or less;

and a second step of heating the aluminum nitride particle covered with the organic silicone compound at a temperature of 300° C. or more and less than 1000° C., wherein the content of carbon atoms in the silicon-containing oxide-coated aluminum nitride particle is less than 1000 ppm by mass.

[2] The method of manufacturing a silicon-containing oxide-coated aluminum nitride particle according to [1], wherein the temperature of heating in the second step is 300° C. or more and 800° C. or less, and the silicon-containing oxide coating is a silica coating, and the silicon-containing oxide-coated aluminum nitride particle is a silica-coated aluminum nitride particle.

[3] The method of manufacturing a silicon-containing oxide-coated aluminum nitride particle according to [1] or [2], wherein a coating amount of the organic silicone compound in the first step is 0.1 mg or more and 1.0 mg or less per m² of surface area calculated from the specific surface area (m²/g) of the aluminum nitride particle as determined by a BET method.

[4] The method of manufacturing a silicon-containing oxide-coated aluminum nitride particle according to any one of [1] to [3], wherein the first step is performed by a dry mixing method or a gas phase adsorption method.

[5] The method of manufacturing a silicon-containing oxide-coated aluminum nitride particle according to any one of [1] to [4], wherein the first step is performed under an atmosphere including no oxygen gas.

[6] The method of manufacturing a silicon-containing oxide-coated aluminum nitride particle according to any one of [1] to [5], wherein the organic silicone compound including a structure represented by the formula (1) includes at least one of a compound represented by the following formula (2) and a compound represented by the following formula (3):

[Chem. 2]

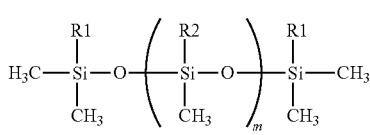
(2)

wherein in the formula (2), R1 and R2 are each independently a hydrogen atom or a methyl group, and at least one of R1 and R2 is a hydrogen atom, and m is an integer of 0 to 10;

[Chem. 3]

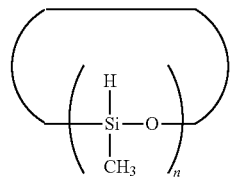
(3)

wherein in the formula (3), n is an integer of 3 to 6.

[7] The method of manufacturing a silicon-containing oxide-coated aluminum nitride particle according to any one of [1] to [6], wherein the first step is performed under a temperature condition of 10° C. or more and 200° C. or less.

[8] A method of manufacturing a heat dispersing resin composition, the method comprising a mixing step of mixing silicon-containing oxide-coated aluminum nitride particles manufactured by the method of manufacturing a silicon-containing oxide-coated aluminum nitride particle according to any one of [1] to [7] with a resin.

[9] A silicon-containing oxide-coated aluminum nitride particle comprising an aluminum nitride particle and a silicon-containing oxide coating covering the surface of the aluminum nitride particle, wherein the content of carbon atoms is less than 1000 ppm by mass, and an Si/Al atom ratio of the surface as measured by AES analysis is 0.29 or more and 5.0 or less.

[10] The silicon-containing oxide-coated aluminum nitride particle according to [9], wherein the Si/Al atom ratio of the surface as measured by AES analysis is 0.33 or more and 2.50 or less.

[11] A silicon-containing oxide-coated aluminum nitride particle including an aluminum nitride particle and a silicon-containing oxide coating covering the surface of the aluminum nitride particle, wherein the content of carbon atoms is less than 1000 ppm by mass, and a coverage of the silicon-containing oxide coating covering the surface of the aluminum nitride particle as determined by LEIS analysis is 15% or more and 100% or less.

[12] The silicon-containing oxide-coated aluminum nitride particle according to [11], wherein the coverage of the silicon-containing oxide coating covering the surface of the aluminum nitride particle as determined by LEIS analysis is 25% or more and 40% or less.

[13] The silicon-containing oxide-coated aluminum nitride particle according to any one of [9] to [12], wherein the content of carbon atoms is 50 ppm by mass or more.

Effects of the Invention

The present invention can provide a method of manufacturing a silicon-containing oxide-coated aluminum nitride particle, the method being capable of manufacturing a silicon-containing oxide-coated aluminum nitride particle such as a silica-coated aluminum nitride particle having improved moisture resistance in which high thermal conductivity is maintained; a method of manufacturing a heat dispersing resin composition containing the silicon-containing oxide-coated aluminum nitride particle; and the silicon-containing oxide-coated aluminum nitride particle.

BRIEF DESCRIPTION OF THE DRAWINGS

FIG. 5 shows the relationship between the specific surface area of silicon-containing oxide-coated aluminum nitride particles as determined by a BET method and the content of silicon atoms in the silicon-containing oxide-coated aluminum nitride particles.

PREFERRED MODE FOR CARRYING OUT THE INVENTION

Below, the present invention will be described in detail.
<<Method of Manufacturing Silicon-Containing Oxide-Coated Aluminum Nitride Particle>>

In the method of manufacturing a silicon-containing oxide-coated aluminum nitride particle according to an embodiment of the present invention, manufactured is a silicon-containing oxide-coated aluminum nitride particle including an aluminum nitride particle and a silicon-containing oxide coating covering the surface of that aluminum nitride particle. Examples of a "silicon-containing oxide" of a silicon-containing oxide coating or a silicon-containing oxide-coated aluminum nitride particle include silica and a composite oxide of elemental silicon and elemental aluminum as described in detail below. Oxides include an oxide, an oxynitride, an oxycarbonitride, and the like.

The method of manufacturing a silicon-containing oxide-coated aluminum nitride particle according to an embodiment of the present invention is characterized by comprising a first step of covering the surface of an aluminum nitride particle with an organic silicone compound including a structure represented by the following formula (1):

[Chem.4]

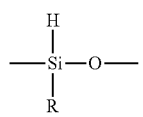

(1)

wherein: in the formula (1), R is an alkyl group having a carbon number of 4 or less;

and a second step of heating the aluminum nitride particle covered with the organic silicone compound at a temperature of 300° C. or more and less than 1000° C., preferably at a temperature of 300° C. or more and 800° C. or less, in which the content of carbon atoms in the silicon-containing oxide-coated aluminum nitride particle is a less than 1000 ppm by mass.

Figure 1:
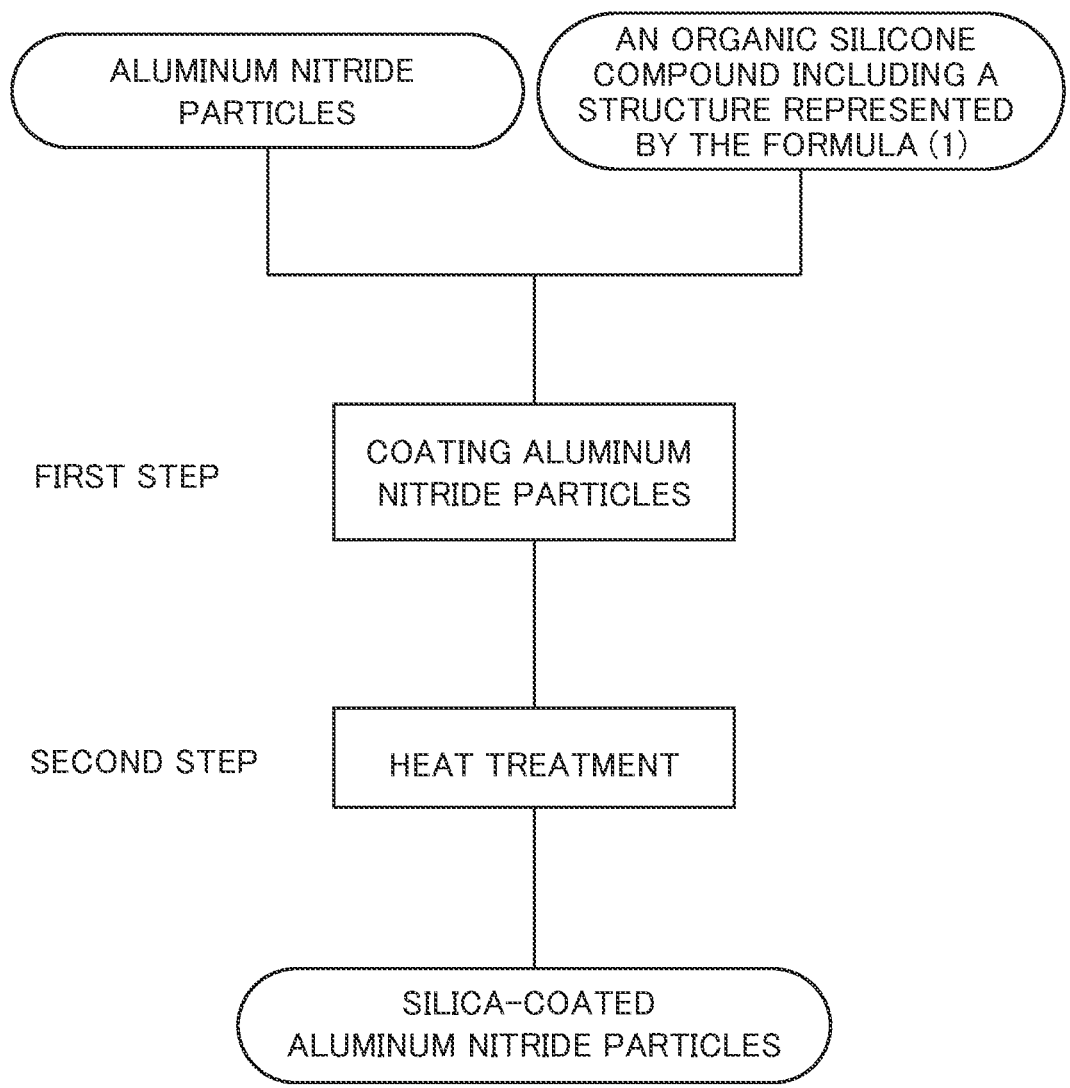
FIG. 1 shows a flow chart of a method of manufacturing a silica-coated aluminum nitride particle according to an embodiment of the present invention.
Figure 2:
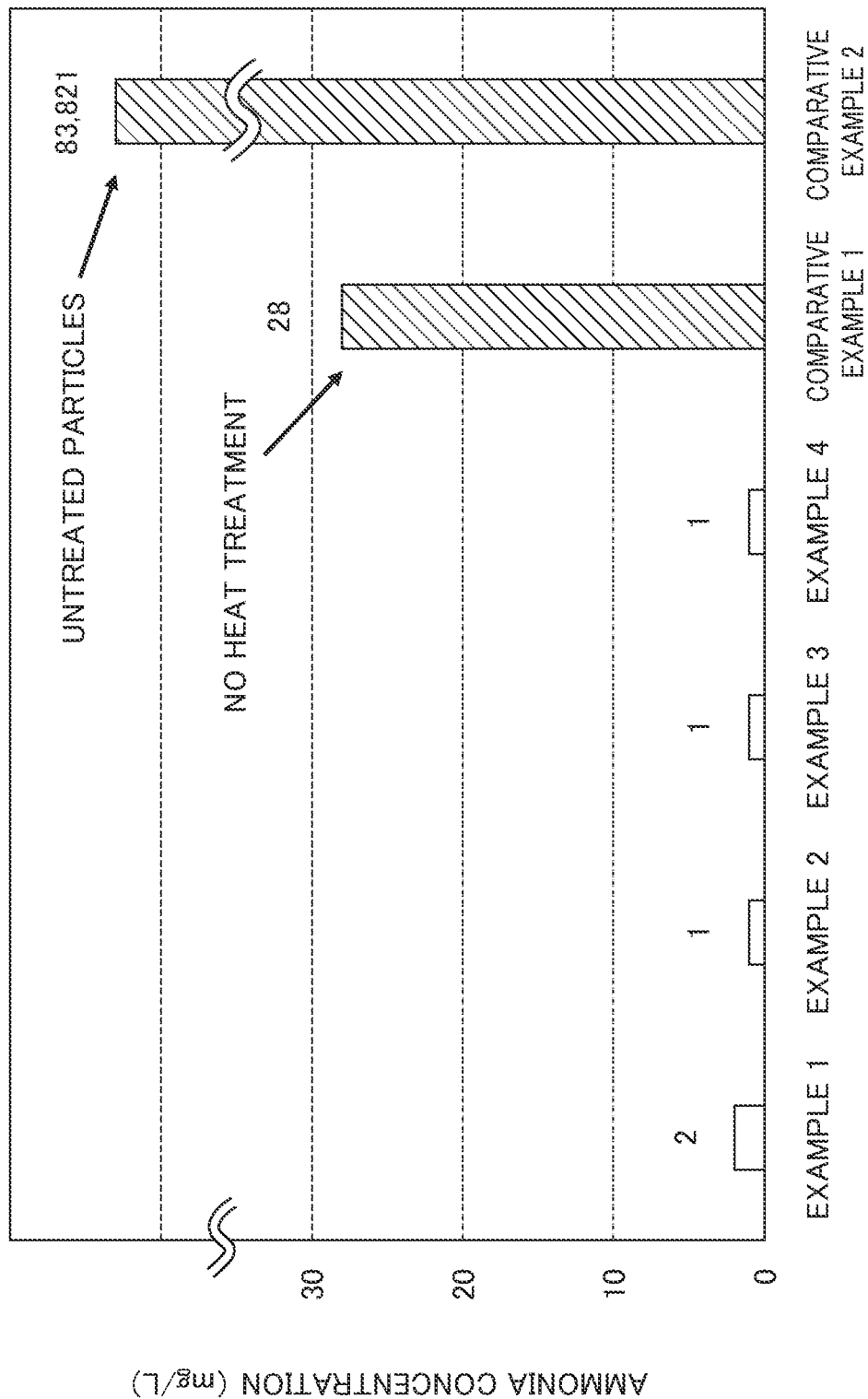
FIG. 2 shows results from evaluating moisture-resistance of particles from Examples and Comparative Examples.
Figure 3:
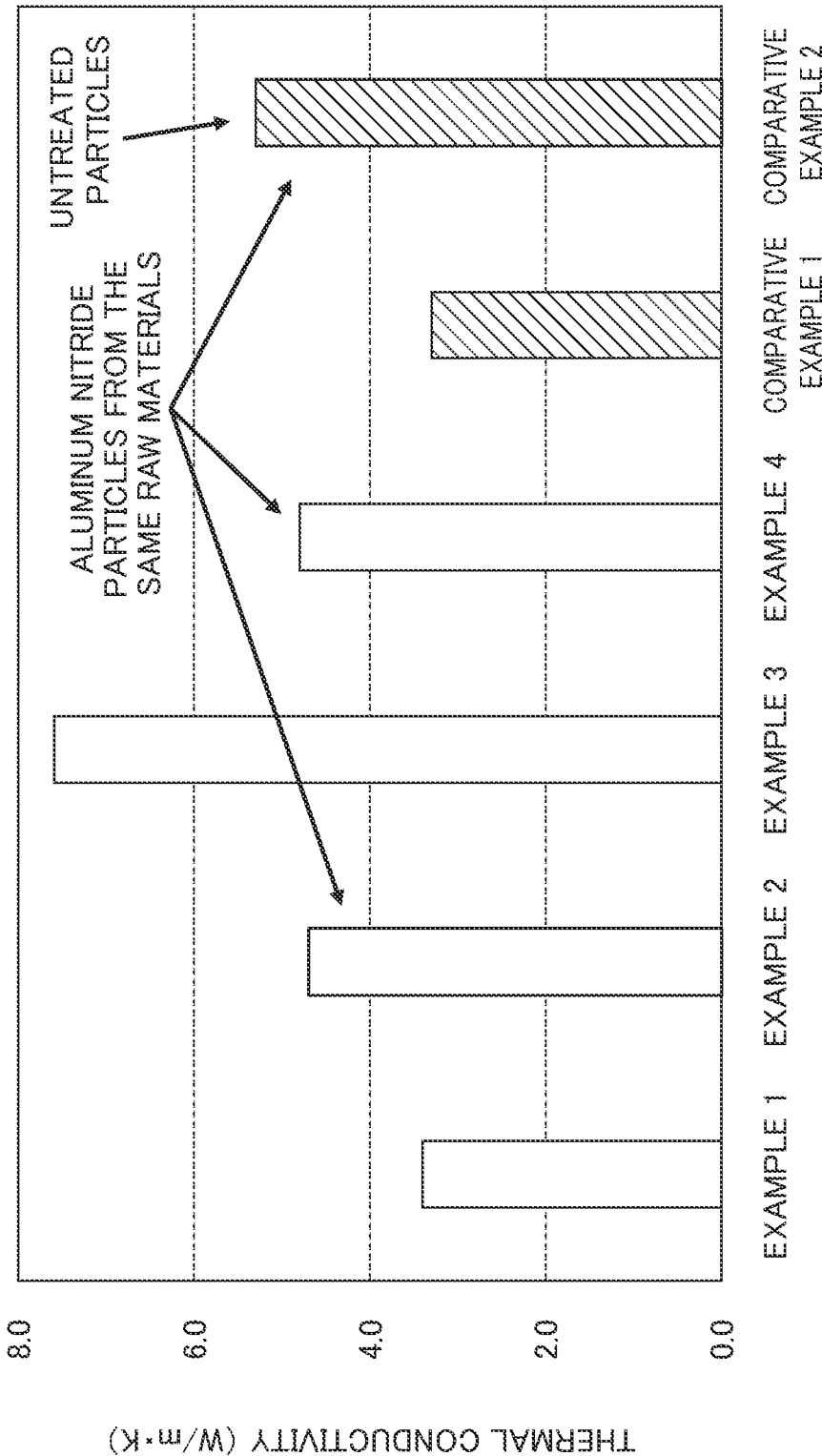
FIG. 3 shows results from evaluating thermal conductivity of particles from Examples and Comparative Examples.
Figure 4:
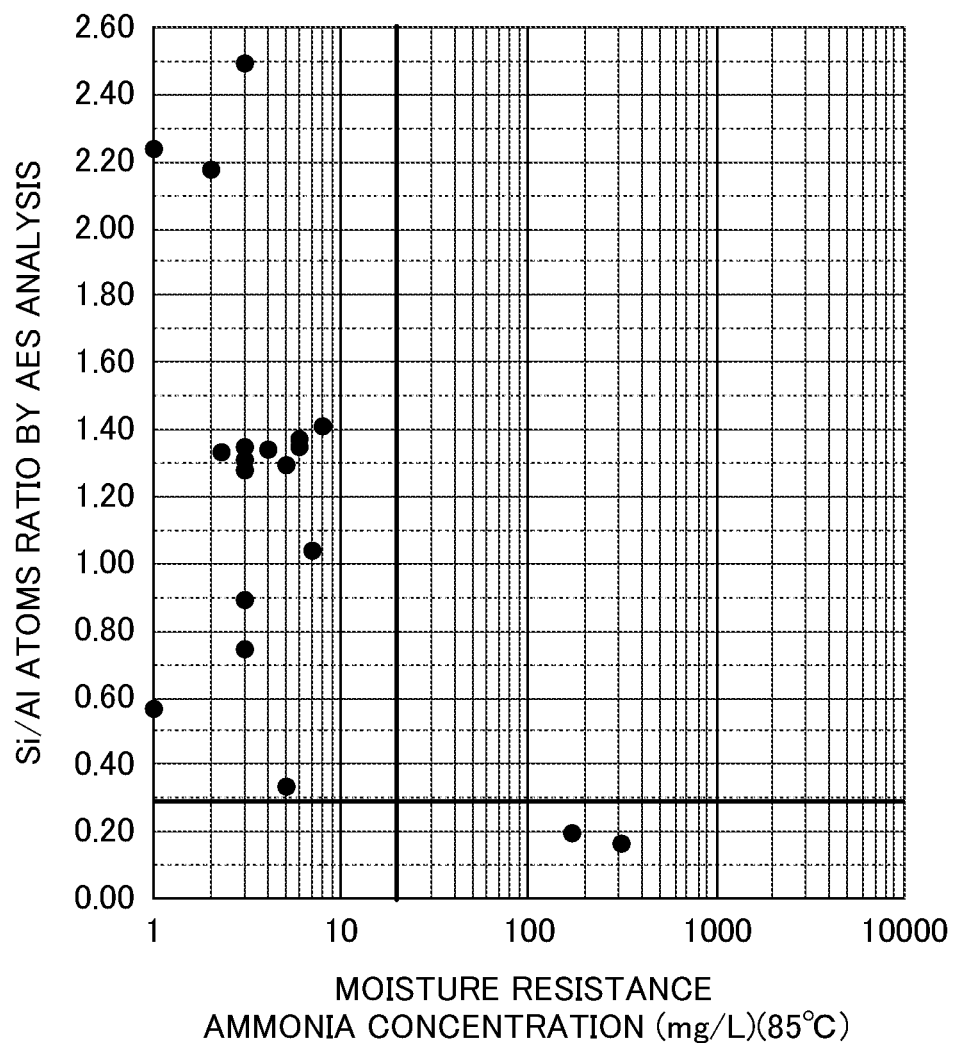
FIG. 4 shows the relationship between the moisture resistance of silicon-containing oxide-coated aluminum nitride particles and the Si/Al atom ratio by AES analysis.

The method of manufacturing a silicon-containing oxide-coated aluminum nitride particle according to an embodiment of the present invention as described above will be explained in detail with reference to FIG. 1. FIG. 1 is a flow chart in which a method of manufacturing a silica-coated aluminum nitride particle according to an embodiment of the present invention is shown as an example of the method of manufacturing a silicon-containing oxide-coated aluminum nitride particle according to an embodiment of the present invention.

[Aluminum Nitride Particle]

A known material such as a commercially available product may be used for an aluminum nitride particle used as a raw material in the method of manufacturing a silicon-containing oxide-coated aluminum nitride particle according to an embodiment of the present invention. There is no particular limitation for a method of manufacturing an aluminum nitride particle, but the followings may be used: a direct nitriding method in which metallic aluminum powder is directly reacted with nitrogen or ammonia; a reduction nitriding method in which alumina is heated under a nitrogen or ammonia atmosphere while performing carbon reduction to simultaneously allow for a nitriding reaction; and the like.

Further, particles in which aggregates of aluminum nitride particulates are granulated by sintering may also be used as aluminum nitride particles. In particular, sintered granules obtained from highly pure aluminum nitride particulates having a d50 in cumulative volume of about 1 μm as a row material can suitably be used as aluminum nitride particles.

The term highly pure aluminum nitride particulate as used herein refers to a particle having both a low oxygen content and less metal impurities. Specifically, for example, a highly pure aluminum nitride having an oxygen content of 1% by mass or less and a total content of metal impurities (that is metal atoms other than aluminum) of 1000 ppm by mass or less is suitable for obtaining higher thermal conductivity of an aluminum nitride particle included in a silicon-containing oxide-coated aluminum nitride particle. Aluminum nitride particles may be used alone or in combination.

It is noted that the aforementioned oxygen content can be measured with an inorganic analyzer equipped with an infrared detector for detecting oxygen and the like. Specifically, the oxygen content can be measured with an analyzer for oxygen, nitrogen, and hydrogen (ONH836: available from LECO Japan Corporation).

Further, the total content of metal atoms other than aluminum can be measured with an ICP (Inductively Coupled Plasma) mass spectrometer and the like. Specifically, the total content of metal atoms other than aluminum can be measured with an ICP mass spectrometer (ICPMS-2030: available from Shimadzu Corporation).

It is noted that the d50 in cumulative volume of particles as used herein represents a particle diameter at which an integrated value of the cumulative volume is 50% for a certain particle size distribution. The d50 in cumulative volume may be obtained from a particle size distribution as determined by a laser diffraction scattering method. Specifically, the d50 in cumulative volume can be measured with a particle size distribution measuring device of a laser diffraction scattering type (Microtracc MT3300EX2: available from MicrotracBEL Corp.).

There is no particular limitation for the shape of an aluminum nitride particle used in the present invention, but examples of the shape include random (crushed), globular, elliptic, plate-like (scale-like) shapes and the like. Further, in a case where silicon-containing oxide-coated aluminum nitride particles as a filler for a heat dispersing material are dispersed and contained in a heat dispersing resin composition, the same type of aluminum nitride particles having the same shape and structure (single species) may be used alone. However, mixtures of aluminum nitride particles where two or more types of different aluminum nitride particles having different shape and structure are mixed at various ratios may also be used.

In a case where silicon-containing oxide-coated aluminum nitride particles are dispersed and contained in a heat dispersing resin composition, a higher volume ratio (filling amount) of aluminum nitride particles of the silicon-containing oxide-coated aluminum nitride particles to the heat dispersing resin composition will increase the thermal conductivity of the heat dispersing resin composition. Therefore, the shape of an aluminum nitride particle is preferably close to a globular shape, such that addition of silicon-containing oxide-coated aluminum nitride particles less increases the viscosity of a heat dispersing resin composition.

The mean aspect ratio (a measure of particle shapes) of aluminum nitride particles is preferably in a range between 0.8 or more and 1.0 or less, more preferably in a range between 0.85 or more and 1.0 or less, and even more preferably in a range between 0.9 or more and 1.0 or less. Here, the mean aspect ratio of aluminum nitride particles corresponds to the arithmetic mean value of a ratio (D1/D2) in which a short diameter (D1) and a long diameter (D2) are measured for each of randomly selected 100 particles in an electron micrograph. It is noted that the short diameter (D1) is the shortest length between two parallel lines in an electron micrograph of aluminum nitride particles, and the long diameter (D2) is the longest length between two parallel lines in the electron micrograph.

The d50 in cumulative volume of aluminum nitride particles used for the present invention is preferably 0.2 μm or more and 200 μm or less, more preferably 10 μm or more and 100 μm or less, and even more preferably in a range between 10 μm or more and 50 μm or less.

A d50 in cumulative volume of aluminum nitride particles falling within the aforementioned ranges can provide a thin heat dispersing material having a minimum thickness even when a heat dispersing resin composition containing silicon-containing oxide-coated aluminum nitride particles is used as a heat dispersing material on which a power-related electronic part will be mounted. In addition, the moisture resistance of aluminum nitride particles can be further improved probably because the surface of an aluminum nitride particle may tend to be uniformly coated.

It is noted that use of relatively fine aluminum nitride particles having a d50 in cumulative volume of 50 μm or less in the method of manufacturing a silicon-containing oxide-coated aluminum nitride particle according to an embodiment of the present invention also does not significantly affect thermal conductivity probably because a thin coating layer of a silicon-containing oxide can be formed.

[Organic Silicone Compound Used for Coating]

There is no particular limitation for an organic silicone compound used as a raw material of a silicon-containing oxide coating of a silicon-containing oxide-coated aluminum nitride particle in the method of manufacturing a silicon-containing oxide-coated aluminum nitride particle according to an embodiment of the present invention, as long as the organic silicone compound includes a structure represented by the above formula (1) regardless of whether it is linear, circular, or branched. The structure represented by the formula (1) is a hydrogensiloxane unit in which hydrogen is directly bound to a silicon atom.

In the above formula (1), R, which is an alkyl group having a carbon number of 4 or less, is preferably a methyl group, an ethyl group, a propyl group, or a t-butyl group, and is in particular preferably a methyl group. An organic silicone compound used as a raw material in the method of manufacturing a silicon-containing oxide-coated aluminum nitride particle according to an embodiment of the present invention is, for example, an oligomer or polymer including a structure represented by the formula (1).

As an organic silicone compound, suitable is, for example, at least one of a compound represented by the following formula (2) and a compound represented by the following formula (3):

[Chem. 5]

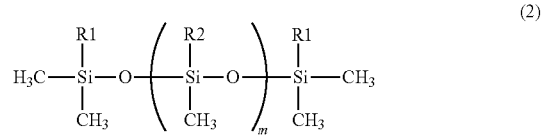

(2)

wherein in the formula (2), R1 and R2 are each independently a hydrogen atom or a methyl group, and at least one of R1 and R2 is a hydrogen atom, and m is an integer of 0 to 10;

[Chem. 6]

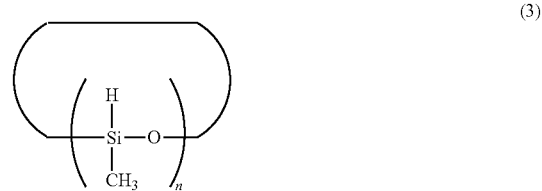

(3)

wherein in the formula (3), n is an integer of 3 to 6.

In particular, a cyclic hydrogensiloxane oligomer having n of 4 in the above formula (3) is adventurous in terms of its capability of forming a uniform coating on the surface of an aluminum nitride particle. The weight average molecular weight of an organic silicone compound including a structure represented by the formula (1) is preferably 100 or more and 2000 or less, more preferably 150 or more and 1000 or less, and even more preferably in a range between 180 or more and 500 or less. Use of an organic silicone compound including a structure represented by the formula (1) and having a weight average molecular weight of this range can promote presumably formation of a thin and uniform coating on the surface of an aluminum nitride particle surface. It is noted that m is preferably 1 in the formula (2).

A weight average molecular weight as used herein is in terms of polystyrene as determined by gel permeation chromatography (GPC). Specifically, it may be measured by means of a combination of a column (Shodex® LF-804: available from Showa Denko K.K.) and a differential refractive index detector (Shodex® RI-71S: available from Showa Denko K.K.).

<First Step>

The surface of an aluminum nitride particle as described above is covered with an organic silicone compound including a structure represented by the above formula (1) in a first step. There is no particular limitation for a method which may be used in the first step as long as the surface of an aluminum nitride particle as described above can be covered with an organic silicone compound including a structure represented by the above formula (1). Methods which may be used in the first step include a dry mixing method and the like in which an organic silicone compound is added by means of spraying and the like while aluminum nitride particles as a raw material are stirred in a common power mixing machine, thereby achieving dry mixing. Powder mixing machines include, for example, a ribbon blender with mixing blades such as a Henschel mixer, a container-rotating V blender, a double-cone blender; a ribbon blender which has a mixing blade; a screw blender; a sealed rotary kiln; stirring with a stirrer in a sealed vessel using magnet coupling; and the like. There is no particular limitation for a temperature condition in this case, which also depends on the boiling point and the vapor pressure of a silicone compound including a structure represented by the formula (1), but a preferred temperature is 10° C. or more and 200° C. or less, more preferably 20° C. or more and 150° C. or less, and even more preferably in a range between 40° C. or more and 100° C. or less.

As a method which may be used in the first step, a gas phase adsorption method may also be used in which a vapor of an organic silicone compound including a structure represented by the formula (1) alone or a gas mixture thereof with an inert gas such as nitrogen gas is attached or deposited on the surface of an aluminum nitride particle in a static state. There is no particular limitation for a temperature condition in this case, which also depends on the boiling point and the vapor pressure of a silicone compound including a structure represented by the formula (1), but a preferred temperature is 10° C. or more and 200° C. or less, more preferably 20° C. or more and 150° C. or less, and even more preferably in a range between 40° C. or more and 100° C. or less. Further, the inside of a system may be pressurized or depressurized, if required. As a machine which may be used in this case, preferred is a machine of a sealed system in which a gas in the system can easily be replaced. For example, a glass vessel, a desiccator, a CVD machine, and the like may be used. The treatment time for coating an aluminum nitride particle with an organic silicone compound without stirring needs to be longer. Nonetheless, a portion unaccessible due to particles which are brought into contact to each other and particles distant from the upper air layer can be well treated by intermittently placing a treatment vessel on a vibrator for dislocation.

There is no particular limitation for the amount of an organic silicone compound including a structure represented by the formula (1) used in the first step. In the aluminum nitride particles obtained in the first step which are covered with an organic silicone compound including a structure represented by the formula (1), the coating amount of the organic silicone compound including a structure represented by the formula (1) is preferably 0.1 mg or more and 1.0 mg or less per $m^2$ of surface area calculated from the specific surface area ($m^2/g$) of the aluminum nitride particles as determined by a BET method, more preferably in a range between 0.2 mg or more and 0.8 mg or less, and even more preferably in a range between 0.3 mg or more and 0.6 mg or less. This may be rationalized as follows. A coating amount of 0.1 mg or more can form a large coating amount of a uniform silicon-containing oxide coating on a silicon-containing oxide-coated aluminum nitride particle which will be obtained via the second step as described below in detail. Further, the coating amount of 1.0 mg or less can form a thin silicon-containing oxide coating which less decreases the thermal conductivity of the resulting silicon-containing oxide-coated aluminum nitride particle. It is noted that the above coating amount of an organic silicone compound including a structure represented by the formula (1) per $m^2$ of surface area calculated from the specific surface area ($m^2/g$) of aluminum nitride particles as determined by a BET method may be obtained by dividing the difference in mass of the aluminum nitride particles before and after coating with the organic compound by the surface area ($m^2$) calculated from the specific surface area ($m^2/g$) of the aluminum nitride particles as determined by the BET method.

It is noted that the specific surface area as determined by a BET method can be measured using the single point BET nitrogen adsorption method by a gas flow method. A Macsorb HM model-1210 from Mountech Co., Ltd. may be used as an evaluation system.

<Second Step>

In a second step, aluminum nitride particles covered with an organic silicone compound obtained in the first step are heated at a temperature of 300° C. or more and less than 1000° C., preferably 300° C. or more and 950° C. or less, and more preferably 300° C. or more and 800° C. or less. This enables a silicon-containing oxide coating to be formed on the surface of an aluminum nitride particle. When heating is performed at a low temperature in the second step, a silica coating can be formed as a silicon-containing oxide coating on the surface of an aluminum nitride particle, thereby producing a silica-coated aluminum nitride particle. When heating is performed at an elevated temperature in the second step, a coating of a composite oxide of elemental silicon and elemental aluminum can be formed as a silicon-containing oxide coating on the surface of an aluminum nitride particle, thereby producing an aluminum nitride particle coated with a composite oxide of elemental silicon and elemental aluminum. A coating of a composite oxide of elemental silicon and elemental aluminum may be formed presumably because a higher temperature in the second step may cause aluminum of an aluminum nitride particle to move to the surface of the aluminum nitride particle where a composite oxide is formed with silicon from an organic silicone compound. A common heating furnace may be used in the second step if aluminum nitride particles covered with an organic silicone compound obtained in the first step can be heated at a temperature of 300° C. or more and less than 1000° C., preferably 300° C. or more and 950° C. or less, and more preferably 300° C. or more and 800° C. or less, that is, if aluminum nitride particles covered with an organic silicone compound obtained in the first step can be maintained at a temperature of 300° C. or more and less than 1000° C., preferably 300° C. or more and 950° C. or less, and more preferably 300° C. or more and 800° C. or less.

In the heat treatment of the second step (heating at a temperature of 300° C. or more and less than 1000° C., preferably 300° C. or more and 950° C. or less, and more preferably 300° C. or more and 800° C. or less), an organic silicone compound including a structure represented by the formula (1) which covers the surface of an aluminum nitride particle is thought to be bound to each other, or bound to a hydroxy group and the like on the surface of the aluminum nitride particle through a dehydrogenation reaction in the initial stage of the heat treatment, thereby further strengthen the coating. Then, an organic group (an alkyl group having a carbon number of 4 or less) of the organic silicone compound is decomposed and vaporized off in the final stage of the heat treatment. Consequently, the content of carbon atoms in the resulting silicon-containing oxide coating is decreased, which, in turn, also decreases the content of carbon atoms in the resulting silicon-containing oxide-coated aluminum nitride particle. In this way, a silicon-containing oxide-coated aluminum nitride particle having a content of carbon atoms of less than 1000 ppm by mass can be obtained. When the content of carbon atoms in a silicon-containing oxide-coated aluminum nitride particle is less than 1000 ppm by mass, good moisture resistance can be obtained, and insulation properties and the like are less affected by unevenly distributed carbon atoms. The content of carbon atoms in a silicon-containing oxide-coated aluminum nitride particle is preferably less than 500 ppm by mass, more preferably less than 300 ppm by mass.

It is noted that a silica coating means a coating formed with a thin film having silica as the main component. However, segments of $AlSiO_4$ ions, SiNO ions, and the like may be detected when analyzed by ToF-SIMS (Time of Flight Secondary Ion Mass Spectrometry, TOF.SIMSS, available from ION-TOF GmbH). This is because multiple inorganic composites may be present at the interface between coated silica and an aluminum nitride particle, and in addition, secondly ions may be bound to each other, and decomposition may occur upon ionization. These composite segments evident from ToF-SIMS analysis can also be defined as a part of detected substances when aluminum nitride is silicated. As a rule of thumb, silica may be considered to be the main component when the amount of secondly electrons from silica is larger than that from other fragments.

In an experiment where the purity of silica can be determined more precisely, the surface of a sample in which a silica coating is formed on a polycrystalline aluminum nitride substrate by a similar method is measured with a photoelectron spectrometer (XPS: X-ray Photoelectron Spectroscopy, Quantera II, available from ULVAC-PHI, INCORPORATED). The kinetic energy of detected photoelectron from Si is substantially in agreement with the standard peak of silica at 103.7 eV, suggesting that the sample is mostly composed of the $SiO_2$ structure. It is noted that an organic component may possibly remain depending on a heating temperature. An organic siloxane component may well be coresident as long as the effects of the present invention are not impaired.

The content of carbon atoms may be measured with a carbon and sulfur analyzer and the like in which a non-dispersive infrared absorption spectrophotometry is used in a tubular electric furnace system. Specifically, a carbon and sulfur anlyzer (Carbon Anlyzer EMIA-821: available from Horiba Ltd.) can be used for measurement.

The heating temperature in the second step is 300° C. or more and less than 1000° C., preferably 300° C. or more and 950° C. or less, and more preferably 300° C. or more and 800° C. or less. When this temperature range is used, a silicon-containing oxide coating having good moisture resistance and thermal conductivity can be formed. Specifically, heating at 300° C. or more can provide good moisture resistance probably because the resulting silicon-containing oxide coating may be densified and thus become less water permeative. Further, heating at less than 1000° C., preferably 950° C. or less, more preferably 800° C. or less can provide good thermal conductivity. In contrast, a temperature of 1000° C. or more may result in poor moisture resistance and thermal conductivity. Further, a heating temperature of 300° C. or more and less than 1000° C., preferably 300° C. or more and 950° C. or less, and more preferably 300° C. or more and 800° C. or less can form a uniform silicon-containing oxide coating on the surface of an aluminum nitride particle. Moreover, a heating temperature of 300° C. or more can confer excellent insulation properties on a silicon-containing oxide coating, and a temperature of less than 1000° C., preferably 950° C. or less, and more preferably 800° C. or less is also effective in terms of energy cost.

The heating temperature is preferably 400° C. or more, more preferably 500° C., and even more preferably 650° C. or more.

Heat time is preferably 30 minutes or more and 12 hours or less, more preferably 30 minutes or more and 6 hours or less, and even more preferably in a range between 45 minutes or more and 4 hours or less. Heat treatment time of 30 minutes or more is preferred because there left no residual decomposition products of an organic group (an alkyl group having a carbon number of 4 or less) of an organic silicone compound, and a silicon-containing oxide coating having a very small content of carbon atoms can be obtained on the surface of an aluminum nitride particle. Moreover, heating time of 6 hours or less is preferred because a silicon-containing oxide-coated aluminum nitride particle can be manufactured with high productive efficiency.

There is no particular limitation for an atmosphere which may be used for heat treatment in the second step, but heating treatment may be performed, for example, under an atmosphere of an inert gas such as $N_2$, Ar, and He or under an atmosphere including a reducing gas such as $H_2$, CO, and $CH_4$. Heating treatment may also be preferably performed under an atmosphere including oxygen gas, for example, under the atmospheric air (in the air).

After heat treatment in the second step, silicon-containing oxide-coated aluminum nitride particles may be partially fused to each other. If this occurs, it can be broken down and crushed to obtain silicon-containing oxide-coated aluminum nitride particles which are free from adhesion and aggregation. It is noted that there is no particular limitation for a machine for use in breaking down and crushing, but a common pulverizer may be used such as a roller mill, a hammer mill, a jet mill, and a ball mill.

After the completion of the second step, the first step and the second step may be further performed in this order. That is, a step of performing the first step and the second step in this order may be repeated.

In a case where the surface of an aluminum nitride particle is covered with an organic silicone compound by a gas phase adsorption method in the first step, a coating process by the gas phase adsorption method can form a uniform and thin silicon-containing oxide coating as compared with a coating process performed by liquid treatment. Therefore, a good thermal conductivity inherent to an aluminum nitride particle can be demonstrated even when the step of performing the first step and the second step in this order is repeated for multiple times, for example, about 2 to 5 times.

Meanwhile, with regard to moisture resistance, a positive correlation is observed between the number of times of the step of performing the first step and the second step in this order and moisture resistance. Accordingly, the number of times of the step of performing the first step and the second step in this order can be selected appropriately depending on the level of moisture resistance required for actual applications.

The silicon-containing oxide-coated aluminum nitride particle obtained by the method of manufacturing a silicon-containing oxide-coated aluminum nitride particle according to an embodiment of the present invention as described above can maintain a high thermal conductivity inherent to an aluminum nitride particle, and also have excellent moisture resistance. Therefore, it can be widely used as a filler for heat dispersing materials which may be used in the electric/electronic fields and the like.

<<Silicon-Containing Oxide-Coated Aluminum Nitride Particle>>

By the method of manufacturing a silicon-containing oxide-coated aluminum nitride particle according to an embodiment of the present invention as described above, the silicon-containing oxide-coated aluminum nitride particle according to an embodiment of the present invention can be obtained, i.e., a silicon-containing oxide-coated aluminum nitride particle having an aluminum nitride particle and a silicon-containing oxide coating covering the surface of the aluminum nitride particle in which the content of carbon atoms is less than 1000 ppm by mass. Examples of a "silicon-containing oxide" of a silicon-containing oxide coating or a silicon-containing oxide-coated aluminum nitride particle include silica as described above and a composite oxide of elemental silicon and elemental aluminum. Oxides include an oxide, an oxynitride, an oxycarbonitride, and the like.

As shown in Example described below, such a silicon-containing oxide-coated aluminum nitride particle according to an embodiment of the present invention can maintain a high thermal conductivity inherent to an aluminum nitride particle, and have excellent moisture resistance. For example, the silicon-containing oxide-coated aluminum nitride particle according to an embodiment of the present invention can show exceptionally superior moisture resistance as evident from an observation where the concentration of ammonia eluted into aqueous hydrochloric acid can be 20 mg/L or less when added to aqueous hydrochloric acid adjusted to pH 4, and treated at 85° C. for 2 hours (that is, silicon-containing oxide-coated aluminum nitride particles are immersed in aqueous hydrochloric acid adjusted to pH 4 at 85° C. for 2 hours). It is noted that a test in which particles are exposed to aqueous hydrochloric acid adjusted to pH 4 can be performed as an accelerated test for moisture resistance. This is because a hydrolysis reaction is more promoted in an acidic solution than in the air. Therefore, use of aqueous hydrochloric acid at pH 4 enables silicon-containing oxide-coated aluminum nitride particles to be evaluated for moisture resistance. In this case, the ammonia concentration of 20 mg/L can be considered to be indicative of good moisture resistance. Further, chemical resistance can also be compared at the same time when aqueous hydrochloric acid at pH 4 is used. The concentration of eluted ammonia is preferably 10 mg/L or less, more preferably 6 mg/L or less. In view of moisture resistance, the content of carbon atoms is preferably as low as possible. Here, in the method of manufacturing a silicon-containing oxide-coated aluminum nitride particle according to an embodiment of the present invention as described above, an organic silicone compound having a structure represented by the formula (1) is used as a raw material. Consequently, the resulting silicon-containing oxide-coated aluminum nitride particle often contains carbon atoms, for example, may include 50 ppm by mass or more or even 60 ppm by mass or more. However, less than 1000 ppm by mass is indicative of excellent moisture resistance as described above.

Further, the silicon-containing oxide-coated aluminum nitride particle according to an embodiment of the present invention preferably has a content of oxygen atoms of 1.60% by mass or less. When the content of oxygen atoms is 1.60% by mass or less, excellent thermal conductivity can be obtained. The content of oxygen atoms in a silicon-containing oxide-coated aluminum nitride particle is more preferably 1.5% by mass or less. Further, the content of oxygen atoms in a silicon-containing oxide-coated aluminum nitride particle is preferably 0.01% by mass or more.

The coverage of a silicon-containing oxide coating ($SiO_2$) covering the surface of an aluminum nitride particle as determined by LEIS analysis can be obtained by the following expression.

$$(S_{Al}(AlN)-S_{Al}(AlN+SiO_2))/S_{Al}(AlN) \times 100 (\%)$$

In the above expression, $S_{Al}(AlN)$ is the area of an Al peak from aluminum nitride particles, and $S_{Al}(AlN+SiO_2)$ is the area of an Al peak from silicon-containing oxide-coated aluminum nitride particles. The area of an Al peak can be determined from analysis by Low Energy Ion Scattering (LEIS) as a measuring method in which an ion source and a rare gas are used as probes. LEIS is an analytical approach in which a rare gas at several keV is used as an incident ion, and is an evaluation approach capable of performing composition analysis of an outermost surface (see The TRC News 201610-04 (October 2016)).

Moreover, as shown in Table 1 where the calcination temperature in the second step was 650° C. as described below, the coverage of a silicon-containing oxide coating covering the surface of an aluminum nitride particle as determined by LEIS analysis for the silicon-containing oxide-coated aluminum nitride particle according to an embodiment of the present invention is, for example, 15% or more and 100% or less, preferably 70% or more and 100% or less, more preferably 95% or less, even more preferably 72% or more and 90% or less, and in particular preferably in a range between 74% or more and 85% or less. When the coverage is 70% or more and 100% or less, more excellent moisture resistance can be obtained. However, it was found that thermal conductivity might be decreased when the coverage is more than 95%. Surprisingly, further examination of the calcination temperature in the second step revealed that a higher calcination temperature could improve a balance between thermal conductivity and moisture resistance as shown in Table 4 below. That is, as the calcination temperature increased, thermal conductivity in Examples 11 to 16 was found to become higher than that obtained from calcination at 650° C. in the second step as shown in Table 1. More surprisingly, the value of the coverage as determined by LEIS analysis in this Example was found to be decreased to about 30% or less as compared with those obtained from calcination at 650° C. in the second step as shown in Table 1 (Examples 3, 5, 6) although the content of silicon was subsequently unchanged. Considering that LEIS measurements in principle reflects analytical values of elements in one surface layer, the silicon-containing oxides covering the surfaces of aluminum nitrides of Table 1 calcinated at 650° C. are presumed to differ from the silicon-containing oxides covering the surfaces of aluminum nitride particles in Table 4 calcinated at higher temperatures in their crystal structures and chemical structures. A silicon-containing oxide-coated aluminum nitride particle such as the silica-coated aluminum nitride particle according to an embodiment of the present invention is presumed to further include on the surface thereof silica or an oxide of silicon atoms having a chemical structure changed by calcination and others, a composite oxide with another element, and the like. Therefore, the coverage of a silicon-containing oxide-coated aluminum nitride particle such as a silica-coated aluminum nitride particle as determined by LEIS analysis is preferably 15% or more, more preferably 20% or more, even more preferably 25% or more, and further more preferably 30% or more. When it is 15% or more, excellent moisture resistance can be obtained. It is also preferably 100% or less, more preferably 95% or less, even more preferably 90% or less, and further more preferably 85% or less. When it is 100% or less, excellent thermal conductivity can be obtained. Preferred is a combination of 15% or more and 100% or less, more preferably 15% or more and 90% or less, even more preferably 15% or more and 45% or less, further more preferably 25% or more and 45% or less, most preferably 30% or more and 40% or less.

Further, the silicon-containing oxide-coated aluminum nitride particle according to an embodiment of the present invention preferably satisfies the following formula (4) and (5), more preferably satisfies the following formula (6) wherein x represents the specific surface area (m²/g) of a silicon-containing oxide-coated aluminum nitride particle as determined by a BET method, and y represents the content of silicon atoms (ppm by mass) in a silicon-containing oxide-coated aluminum nitride particle.

$$y \leq 1000x+500 \quad (4)$$

$$y \geq 100 \quad (5)$$

$$0.03 \leq x \leq 5 \quad (6)$$

It is noted that the content of silicon atoms may be measured by an ICP method. Further, the specific surface area x of a silicon-containing oxide-coated aluminum nitride particle as determined by a BET method may be measured by the single point BET nitrogen adsorption method using a gas flow method as in the aforementioned specific surface area of an aluminum nitride particle as determined by a BET method. A Macsorb HM model-1210 available from Mountech Co., Ltd. may be used as an evaluation apparatus.

Moreover, there is no particular limitation for the content of silicon atoms in the silicon-containing oxide-coated aluminum nitride particle according to an embodiment of the present invention, but it may be, for example, 5000 ppm by mass or less, preferably 3000 ppm by mass or less, more preferably 2800 ppm by mass or less, and even more preferably 2600 ppm by mass or less. The content of silicon atoms in a silicon-containing oxide-coated aluminum nitride particle is, for example, 100 ppm by mass or more.

Moreover, the silicon-containing oxide-coated aluminum nitride particle according to an embodiment of the present invention preferably has an Si/Al atom ratio of the surface thereof of 0.29 or more, preferably 0.30 or more, and more preferably 0.32 or more, the Si/Al atom ratio being measured by AES (Auger Electron Spectroscopy) analysis. When the Si/Al atom ratio by AES analysis is 0.29 or more as described above, excellent moisture resistance can be obtained. There is no particular limitation for the upper limit of the Si/Al atom ratio of the surfaces of a silicon-containing oxide-coated aluminum nitride particle as measured by AES analysis, but it may be, for example, 5.0 or less.

The Si/Al atom ratio of the surfaces of a silicon-containing oxide-coated aluminum nitride particle as measured by AES analysis can be measured with an Augier electron spectroscopy (PHI-680, available from ULVAC-PHI, INCORPORATED).

<<Method of Manufacturing Heat Dispersing Resin Composition>>

The silicon-containing oxide-coated aluminum nitride particle according to an embodiment of the present invention as described above can be used to manufacture a heat dispersing resin composition. That is, the method of manufacturing a heat dispersing resin composition according to an embodiment of the present invention comprises a mixing step of mixing silicon-containing oxide-coated aluminum nitride particles manufactured by the aforementioned method of manufacturing a silicon-containing oxide-coated aluminum nitride particle with a resin. Examples of a "silicon-containing oxide" of a silicon-containing oxide coating or a silicon-containing oxide-coated aluminum nitride particle include silica as described above and a composite oxide of elemental silicon and elemental aluminum. Oxides include an oxide, an oxynitride, an oxycarbonitride, and the like. Silicon-containing oxide-coated aluminum nitride particles manufactured by the aforementioned method of manufacturing a silicon-containing oxide-coated aluminum nitride particle can maintain a high thermal conductivity inherent to an aluminum nitride particle, and have improved moisture resistance. Therefore, a heat dispersing resin composition obtained by the method of manufacturing a heat dispersing resin composition according to an embodiment of the present invention will be excellent in moisture resistance and thermal conductivity.

Silicon-containing oxide-coated aluminum nitride particles manufactured by the aforementioned method of manufacturing a silicon-containing oxide-coated aluminum nitride particle are mixed with a resin in the mixing step.

There is no particular limitation for a resin to be mixed in the mixing step, but it is preferably a thermosetting resin, a thermoplastic resin, or a mixture of a thermosetting resin and a thermoplastic resin in view of excellent thermal resistance of the resulting heat dispersing resin composition. Thermosetting resins include, for example, silicone resins, epoxy resins, phenol resins, bismaleimide resins, cyanate resins, urethane resins, (meth)acrylic resins, vinylester resins, unsaturated polyester resins, polyvinyl alcohol acetal resins, and the like. They may be used alone or mixed in combination of two or more. A mixture may be used in which a curing agent or a curing accelerator is added to a thermosetting resin. In particular, an epoxy resin is preferred in view of good thermal resistance, adhesiveness, and electrical properties after curing, and a silicone resin is preferred for applications in which flexible adhesiveness is important.

It is noted that silicone resins include addition reaction-curable silicone resins, condensation reaction-curable silicone resins, organic peroxide-curable silicone resins, and the like. They may be used alone or in combination of two or more having different viscosities. In particular, when the resulting heat dispersing resin composition is used for applications in which flexible adhesiveness is important, silicone resins include, for example, addition reaction-curable liquid silicone resins in which no by-products possibly acting as causative substances for air bubbles and the like are produced. A cured silicone resin can be obtained by reacting organopolysiloxane having an alkenyl group, which serves as a base polymer, with organopolysiloxane having an Si—H group, which serves as a cross-linking agent, at ordinary temperature or an elevated temperature in the presence of a curing agent. It is noted that specific examples of organopolysiloxane serving as a base polymer include, for example, those having a vinyl group, an allyl group, a propenyl group, a hexenyl group, and the like as an alkenyl group. In particular, a vinyl group is preferred for organopolysiloxane. Further, a curing catalyst, for example, a platinum metal-based curing catalyst may be used. The addition amount thereof may also be adjusted to achieve a desired hardness of a cured resin.

Epoxy resins include bifunctional glycidyl ether epoxy resins such as a bisphenol A epoxy resin, a bisphenol F epoxy resin, a bisphenol S epoxy resin, a hydrogenated bisphenol A epoxy resin, and a biphenyl epoxy resin; glycidyl ester epoxy resins such as hexahydrophthalic acid glycidyl ester and dimer acid glycidyl ester; linear aliphatic epoxy resins such as epoxidized polybutadiene and epoxidized soybean oil; heterocyclic epoxy resins such as triglycidyl isocyanurate; glycidyl amine epoxy resins such as N,N,N',N'-tetraglycidyl-4,4'-diaminodiphenylmethane, N,N,N',N'-tetraglycidyl-1,3-benzenedi(methanamine), 4-(glycidyloxy)-N,N-diglycidyl aniline, 3-(glycidyloxy)-N,N-diglycidyl aniline; polyfunctional glycidyl ether epoxy resins such as a phenol novolak epoxy resin, a cresol novolak epoxy resin, a biphenylaralkyl epoxy resin, a naphthalenearalkyl epoxy resin, a tetrafunctional naphthalene epoxy resin, and a triphenylmethane epoxy resin; and the like. The aforementioned epoxy resins may be used alone, or may be mixed and used in combination of two or more.

When the aforementioned epoxy resins are used, a curing agent or a curing accelerator may be blended. Curing agents include, for example, alicyclic acid anhydrides such as methyltetrahydrophthalic anhydride, methylhexahydrophthalic anhydride, and himic acid anhydride; aliphatic acid anhydrides such as dodecenyl succinic anhydride; aromatic acid anhydrides such as phthalic anhydride and trimellitic anhydride; bisphenols such as bisphenol A, bisphenol F, and bisphenol S; phenol resins such as a phenol formaldehyde resin, a phenol aralkyl resin, a naphthol aralkyl resin, and a phenol-dicyclopentadiene copolymer resin; organic dihydrazides such as dicyandiamide and adipic acid dihydrazide. Curing catalysts include, for example, amines such as tris(dimethylaminomethyl)phenol, dimethylbenzylamine, 1,8-diazabicyclo(5,4,0)undecene, and derivatives thereof; imidazoles such as 2-methylimidazole, 2-ethyl-4-methylimidazole, and 2-phenylimidazole, and derivatives thereof. These may be used alone, or may be mixed and used in combination of two or more.

A commonly used filler such as boron nitride, alumina, silica, and zinc oxide other than the aforementioned silicon-containing oxide-coated aluminum nitride particles may be used in combination in the mixing step.

The aforementioned silicon-containing oxide-coated aluminum nitride particles and a filler other than the aforementioned silicon-containing oxide-coated aluminum nitride particles may be mixed in the mixing step in those amounts sufficient for providing a desired heat dispersing resin composition. The total content of the aforementioned silicon-containing oxide-coated aluminum nitride particles and a filler other than the aforementioned silicon-containing oxide-coated aluminum nitride particles in the resulting heat dispersing resin composition is preferably 50 vol % or more and 95 vol % or less, more preferably 60 vol % or more and 90 vol % or less, and even more preferably in a range between 70 vol % or more and 90 vol % or less. A total content of 50 vol % or more can provide good heat dispersing properties, and a total content of 95 vol % or less can provide good workability upon when a heat dispersing resin composition is used.

Further, the content of silicon-containing oxide-coated aluminum nitride particles in the resulting heat dispersing resin composition is preferably 30 vol % or more and 100 vol % or less of the total content of the aforementioned silicon-containing oxide-coated aluminum nitride particles and a filler other than the aforementioned silicon-containing oxide-coated aluminum nitride particles, more preferably 40 vol % or more and 100 vol % or less, and even more preferably in a range between 50 vol % or more and 100 vol % or less. A total content of 30 vol % or more can show good heat dispersing properties.

In the mixing step, a flexibility-conferring agent such as silicone, urethane acrylate, a butyral resin, an acrylic rubber, diene-based rubber, and copolymers thereof; a silane-based coupling agent; a titanium-based coupling agent; an inorganic ion scavenger; a pigment; a dye; a diluent; a solvent; and the like may be further added in an appropriate way, if required.

There is no particular limitation for a mixing method in the mixing step, but, for example, a method may be used in which silicon-containing oxide-coated aluminum nitride particles, a resin, and other additives, and the like are all at once or in portions mixed, dissolved, and kneaded, if required, with heating, using a dispersing/dissolving machine such as a stone mill, a planetary mixer, a planetary centrifugal mixer, a kneader, and a roll mill alone or in combination.

The resulting heat dispersing resin composition may be formed into a sheet-like shape and, if required, reacted to provide a heat dispersing sheet. The heat dispersing resin composition and the heat dispersing sheet as described above may be suitably used for adhesive applications for semiconductor power devices, power modules, and the like.

Methods of manufacturing a heat dispersing sheet include a method in which a heat dispersing resin composition sandwiched between base films is subjected to compression-press forming; a method in which a heat dispersing resin composition is applied on a base film by using a device such as a bar coater, screen printing, a blade coater, a die coater, and a comma coater; and the like. Further, a heat dispersing sheet after forming/application may be subjected to an additional treatment step such as a step of removing a solvent, a step of achieving the B-stage by heating and the like, a step of performing complete curing. As described above, heat dispersing sheets of various forms can be obtained depending on steps used. This enables them to be widely used in target application fields and usages.

When applying or forming a heat dispersing resin composition on a base film, a solvent may be used in order to improve workability. There is no particular limitation for a solvent, but the followings may be used alone or may be mixed and used in combination of two or more: ketone-based solvents such as acetone, methyl ethyl ketone, methyl isobutyl ketone, cyclopentanone, and cyclohexanone; ether-based solvents such as 1,4-dioxane, tetrahydrofuran, and diglyme; glycol ether-based solvents such as methyl cellosolve, ethyl cellosolve, propylene glycol monomethyl ether, propylene glycol monoethyl ether, propylene glycol monobutyl ether, propylene glycol monomethyl ether acetate, propylene glycol monoethyl ether acetate, diethylene glycol methyl ethyl ether; and in addition, benzyl alcohol; N-methylpyrrolidone; γ-butyrolactone; ethyl acetate; N,N dimethylformamide; and the like.

In order to form a heat dispersing resin composition into a sheet-like shape, sheet-forming ability for retaining a sheet-like shape is required. A high molecular weight component may be added to a heat dispersing resin composition in order to obtain sheet-forming ability. For example, mentioned are phenoxy resins, polyimide resins, polyamide resins, polycarbodiimide resins, cyanate ester resins, (meth)acrylic resins, polyester resins, polyethylene resins, polyether sulfone resins, polyetherimide resins, polyvinyl acetal resins, urethane resins, acrylic rubber, and the like. Among these, in view of excellent thermal resistance and film-forming ability, phenoxy resins, polyimide resins, (meth)acrylic resins, acrylic rubber, cyanate ester resins, polycarbodiimide resins are preferred, and phenoxy resins, polyimide resins, (meth)acrylic resins, and acrylic rubber are more preferred. They may be used alone, or may be used as a mixture or a copolymer of two or more.

The molecular weight of a high molecular weight component is preferably a weight average molecular weight of 10000 or more and 100000 or less, more preferably a weight average molecular weight in a range of 20000 or more and 50000 or less.

It is noted that a good sheet-like shape with good handling properties can be retained by adding a component having a weight average molecular weight in the above ranges.

There is no particular limitation for the addition amount of a high molecular weight component, but in order to retain a sheet-like shape, it is preferably 0.1% by mass or more and 20% by mass or less relative to a heat dispersing resin composition, more preferably 1% by mass or more and 15% by mass or less, and even more preferably in a range between 2% by mass or more and 10% by mass or less. It is noted that an addition amount of 0.1% by mass or more and 20% by mass or less enables formation of a good sheet or film with good handling properties.

There is no particular limitation for a base film used for manufacturing a heat dispersing sheet, as long as it can resistant to step conditions such as heating and drying. For example, mentioned are a film including polyester having an aromatic ring such as polyethylene terephthalate (PET), polybutylene terephthalate (PBT); a polypropylene film; a polyimide film; a polyetherimide film, and the like. The aforementioned films may be multilayered films in which two or more types are combined, or those surface-treated with a parting agent such as a silicone-based agent. It is noted that the thickness of a base film is preferably 10 μm or more and 100 μm or less.

The thickness of a heat dispersing sheet formed on a base film is preferably 20 μm or more and 500 μm or less, more preferably 50 μm or more and 200 μm or less. When the thickness of a heat dispersing sheet is 20 μm or more, a heat dispersing sheet with uniform composition can be obtained. When it is 500 μm or less, good heat dissipation properties can be obtained.

EXAMPLES

Below, the present invention will be described specifically with reference to Examples and Comparative Examples. However, the scope of the present invention shall not be limited to these Examples in any sense.

[Measurement of Coating Amount of Organic Silicone Compound Per m² of Surface Area Calculated from Specific Surface Area (m²/g) of Aluminum Nitride Particles as Determined by BET Method]

The coating amount of an organic silicone compound per m² of surface area calculated from the specific surface area (m²/g) of aluminum nitride particles as determined by a BET method was obtained by the following expression (weight change method) from [the mass (mg) of aluminum nitride particles coated with an organic silicone compound], [the mass (mg) of aluminum nitride particles], and [the specific surface area (m²/g) of aluminum nitride particles as determined by a BET method] obtained from the method described below. Results are shown in the sections titled as "Coating amount of organic silicone compound" in the tables.

[The coating amount of an organic silicone compound per m² of surface area calculated from the specific surface area (m²/g) of aluminum nitride particles as determined by a BET method]=[the difference in mass (mg) of aluminum nitride particles before and after coated with an organic silicone compound]/[the surface area (m²) calculated from the specific surface area (m²/g) of aluminum nitride particles as determined by a BET method]

wherein [the difference in mass (mg) of aluminum nitride particles before and after coated with an organic silicone compound]=[the mass (mg) of aluminum nitride particles coated with an organic silicone compound]–[the mass (mg) of aluminum nitride particles], and
[the surface area (m²) calculated from the specific surface area (m²/g) of aluminum nitride particles as determined by a BET method]=[the specific surface area (m²/g) of aluminum nitride particles as determined by a BET method]×[the mass (g) of aluminum nitride particles].

[Measurement of Content of Carbon Atoms in Silicon-Containing Oxide-Coated Aluminum Nitride Particles]

The content of carbon atoms in silicon-containing oxide-coated aluminum nitride particles was measured with a carbon and sulfur analyzer in which the non-dispersive infrared absorption spectrophotometry was used in a tubular electric furnace system (Carbon Anlyzer EMIA-821: available from Horiba Ltd.).

[Measurement of Content of Oxygen Atoms in Silicon-Containing Oxide-Coated Aluminum Nitride Particles]

The content of oxygen atoms in silicon-containing oxide-coated aluminum nitride particles was measured with an analyzer for oxygen, nitrogen, and hydrogen (ONH836: available from LECO Japan Corporation) after heating the silicon-containing oxide-coated aluminum nitride particles at 105° C. for 2 hours.

[Measurement of Content of Silicon Atoms in Silicon-Containing Oxide-Coated Aluminum Nitride Particles]

The content of silicon atoms in silicon-containing oxide-coated aluminum nitride particles was measured in accordance with the following procedures.

(1) A 10 cc solution in which 97% by mass of sulfuric acid (super special grade, available from Wako Pure Chemical Industries, Ltd.) and ion exchange water were mixed in 1:2 (volume ratio) and 0.5 g of a sample (silicon-containing oxide-coated aluminum nitride particles) were charged into a 20 cc Teflon® vessel.

(2) The Teflon® vessel was placed in a stainless-steel pressure tight container, and maintained at 230° C. for 15 hours to dissolve the charged sample.

(3) The solution mixed in (1) was removed, and the content of silicon atoms in silicon-containing oxide-coated aluminum nitride particles was calculated from the concentration of silicon atoms as measured with an ICP (ICPS-7510, available from Shimadzu Corporation).

[Measurement of Coverage of Silicon-Containing Oxide Coating Covering Surface of Aluminum Nitride Particle as Determined by LEIS Analysis]

The coverage of a silicon-containing oxide coating covering the surface of an aluminum nitride particle was determined from analysis by low energy ion scattering (LEIS) in which an ion source and a rare gas were used as probes. A Qtac100 system available from IONTOF was used for LEIS. Helium at 3 keV and 6 keV and neon at 5 keV are used as incident ions. It is noted that an energy spectrum of backward scattering particles was obtained after oxygen cleaning. Then, the coverage of a silicon-containing oxide coating covering the surface of an aluminum nitride particle was calculated by the following expression based on values of the area of an Al peak from aluminum nitride particles and the area of an Al peak from silicon-containing oxide-coated aluminum nitride particles in the energy spectrum.

$$(S_{Al}(AlN) - S_{Al}(AlN+SiO_2))/S_{Al}(AlN) \times 100 (\%)$$

In the above expression, $S_{Al}(AlN)$ represents the area of an Al peak from aluminum nitride particles, and $S_{Al}(AlN+$ SiO$_2$) represents the area of an Al peak from silicon-containing oxide-coated aluminum nitride particles.

[Measurement of Specific Surface Area of Aluminum Nitride Particles as Determined by BET Method and Specific Surface Area x of Silicon-Containing Oxide-Coated Aluminum Nitride Particles as Determined by BET Method]

The specific surface area of aluminum nitride particles as determined by a BET method and the specific surface area x of silicon-containing oxide-coated aluminum nitride particles as determined by a BET method were each measured with a Macsorb HM model-1210 available from Mountech Co., Ltd. It is noted that a gas mixture of 70 vol % of He and 30 vol % of N$_2$ was used as an adsorption gas. The specific surface areas x of silicon-containing oxide-coated aluminum nitride particles as determined by a BET method are shown in the sections titled as "BET specific surface area×(m$^2$/g)" in the tables.

[Measurement of Si/Al Atom Ratio of Surface of Silicon-Containing Oxide-Coated Aluminum Nitride Particle as Measured by AES Analysis]

The Si/Al atom ratio of the surface of a silicon-containing oxide-coated aluminum nitride particle as measured by AES analysis was measured by the following method using Augier electron spectroscopy. Silicon-containing oxide-coated aluminum nitride particles were embedded and fixed on an indium foil using hand press, and a spectrum was acquired with an Augier electron spectroscopy (PHI-680, available from ULVAC-PHI, INCORPORATED) by performing measurement at an electron-beam acceleration voltage of 2 kV and an electric current of 1 nA. The spectrum acquired was subjected to first derivation, and the height of a peak from each element was used to calculate the ratio of the number of Si atoms to the total number of Si atoms, O atoms, Al atoms, N atoms, and C atoms, and the ratio of the number of Al atoms to the total number of Si atoms, O atoms, Al atoms, N atoms, and C atoms. The ratio of the number of Si atoms to the total number of Si atoms, O atoms, Al atoms, N atoms, and C atoms, and the ratio of the number of Al atoms to the total number of Si atoms, O atoms, Al atoms, N atoms, and C atoms as calculated above were used to further calculate the Si/Al atom ratio. Spectra were acquired at the total of 12 measurement points; 3 points per view, the total of 4 views, and an Si/Al atom ratio calculated from each of the spectra was used to compute the mean value which was designated as the "Si/Al atom ratio of the surface of a silicon-containing oxide-coated aluminum nitride particle as measured by AES analysis", and shown at the sections titled as "Si/Al atom ratio by AES analysis" in the tables.

[Evaluation of Moisture Resistance of Particles]

The moisture resistance of particles such as silicon-containing oxide-coated aluminum nitride particles was determined as follows. To a 50 ml sample tube, charged and sealed were 3 g of silicon-containing oxide-coated aluminum nitride particles and 17 g of aqueous hydrochloric acid adjusted to pH 4. The tube was then shaken in a shaker incubator under conditions of 60° C. or 85° C. and 80 rpm for 2 hours, and allowed to stand, and the cooled to the room temperature (25° C.). The concentration of ammonia in the supernatant was measured with an ammonia electrode (an ammonia electrode 5002A: available from Horiba Ltd.) under a temperature condition of 25° C. Results are shown in the sections titled as "Moisture resistance ammonia concentration" in the tables along with measurement temperatures.

[Measurement of Thermal Conductivity of Resin Sheet (Heat Dispersing Sheet)]

The thermal diffusivity of a resin sheet was measured at 25° C. with a laser-flash thermal diffusivity measurement device (LFA447 NanoFlash: available from NETZSCH GmbH). Further, the theoretical specific heat and theoretical density of a resin sheet were obtained from the weighted mean in consideration of the blended amount of each component, assuming that the additive property was simply applicable to each component. Then, a value calculated by multiplying the thermal diffusivity by the theoretical specific heat and the theoretical density was taken as the thermal conductivity of a resin sheet in the thickness direction.

A sample for thermal diffusivity measurement was prepared as follows. A 10 mm×10 mm sample with a thickness of 300 μm was cut out of a resin sheet, and coated with gold on the both sides with an ion coater (IB-3, available from EIKO Corporation), and then further coated with graphite on the both sides.

It is noted that the theoretical specific heat of a resin sheet from each of Examples and Comparative Examples was calculated assuming that the theoretical specific heat of aluminum nitride was 0.73 J/g·K, and the theoretical specific heat of a resin component was 1.80 J/g·K, and the theoretical specific heat of a high molecular weight component was 1.80 J/g·K. Further, the theoretical density of a resin sheet from each of Examples and Comparative Examples was calculated assuming that the theoretical density of aluminum nitride was 3.26 g/cm$^3$, and the theoretical density of a resin component was 1.17 g/cm$^3$, and the theoretical density of a high molecular weight component was 1.17 g/cm$^3$. It is noted that a solvent was assumed to be completely volatilized, and a curing agent, which was in a trace amount, was ignored.

[Preparation of Particles]

Example 1

A vacuum desiccator made of a 20-mm thick acrylic resin plate and having inside dimensions of 260 mm×260 mm×100 mm and having a two-tiered structure separated by a partition with through-holes was used for surface coating of aluminum nitride particles in a first step. About 30 g of aluminum nitride particles-A (JM: available from Toyo Aluminium K.K.) having a d50 in cumulative volume of 3 μm and having a specific surface area of 2.4 m$^2$/g as determined by a BET method was uniformly spread over and allowed to stand on the upper stage of the vacuum desiccator. Next, 10 g of an organic silicone compound-A (cyclic methylhydrogensiloxane tetramer: available from Tokyo Chemical Industry Co., Ltd.) in which n=4 in the formula (3) was placed in a glass petri dish, and allowed to stand on the lower stage of the vacuum desiccator. Then, the vacuum desiccator was closed, and heated in an 80° C. oven for 30 hours. It is noted that safety measures were taken as follows during operation: for example, hydrogen gas generated from a reaction was released through an open valve of the vacuum desiccator. The coating amount of an organic silicone compound including a structure represented by the formula (1) which was used to coat the surfaces of aluminum nitride particles after the completion of the first step was 0.33 mg per m$^2$ of surface area calculated from the specific surface area of aluminum nitride particles as determined by a BET method. After the completion of the first step, the sample was removed from the desiccator, and placed in an alumina crucible. The sample was then heat treated under a condition of 650° C. for 1.5 hours in the air in a second step to obtain silica-coated aluminum nitride particles as silicon-containing oxide-coated aluminum nitride particles.

Example 2

A sample was prepared as in Example 1 except that the aluminum nitride particles-A used as a raw material in Example 1 were replaced with aluminum nitride particles-B (TFZ-N15P: available from Toyo Aluminium K.K.) having a d50 in cumulative volume of 16 μm and having a specific surface area of 0.5 $m^2/g$ as determined by a BET method. It is noted that the coating amount of an organic silicone compound including a structure represented by the formula (1) which was used to coat the surfaces of aluminum nitride particles after the completion of the first step was 0.70 mg per $m^2$ of surface area calculated from the specific surface area of aluminum nitride particles as determined by a BET method.

Example 3

A sample was prepared as in Example 1 except that the aluminum nitride particles-A used as a raw material in Example 1 were replaced aluminum nitride particles-C (FAN-f50-A1: available from Furukawa Denshi Co., Ltd.) having a d50 in cumulative volume of 50 μm and having a specific surface area of 0.07 $m^2/g$ as determined by a BET method. It is noted that the coating amount of an organic silicone compound including a structure represented by the formula (1) which was used to coat the surfaces of aluminum nitride particles after the completion of the first step was 0.71 mg per $m^2$ of surface area calculated from the specific surface area of aluminum nitride particles as determined by a BET method.

Example 4

A sample was prepared as in Example 2 except that the organic silicone compound-A used as a raw material in Example 2 was replaced with an organic silicone compound-B (LS-8150: available from Shin-Etsu Chemical Co., Ltd.) in which R1 is a methyl group, and R2 is hydrogen, and m is 1 in the formula (2). It is noted that the coating amount of an organic silicone compound including a structure represented by the formula (1) which was used to coat the surfaces of aluminum nitride particles after the completion of the first step was 0.56 mg per $m^2$ of surface area calculated from the specific surface area of aluminum nitride particles as determined by a BET method.

Comparative Example 1

Treatment up to the first step was performed using the same raw materials and step conditions as those in Example 1, but heat treatment in the second step was not performed. It is noted that the coating amount of an organic silicone compound including a structure represented by the formula (1) which was used to coat the surfaces of aluminum nitride particles after the completion of the first step was 0.35 mg per $m^2$ of surface area computed from the specific surface area of aluminum nitride particles as determined by a BET method.

Comparative Example 2

Untreated particles of the aluminum nitride particles-B which were used as a raw material in Example 2, but subjected to none of the steps in Examples were used in Comparative Example 2.

Example 5

Silica-coated aluminum nitride particles as silicon-containing oxide-coated aluminum nitride particles were prepared as in Example 3 except that the desiccator was vibrated with a vibrator every hour when the desiccator was closed, and heated in a 80° C. oven for 30 hours in the first step.

Comparative Example 3

Untreated particles of the aluminum nitride particles-C used as a raw material in Example 3, but subjected to none of the steps in Example 3 were used as Comparative Example 3.

Example 6

Silica-coated aluminum nitride particles as silicon-containing oxide-coated aluminum nitride particles were prepared as in Example 3 except that after the second step, the first step and the second step were further performed in this order. It is noted that the coating amount of an organic silicone compound after the first step for the first time and the coating amount of an organic silicone compound after the first step for the second time were both 0.65 $mg/m^2$.

Example 7

Silica-coated aluminum nitride particles as silicon-containing oxide-coated aluminum nitride particles were prepared as in Example 3 except that the aluminum nitride particles-C used as a raw material in Example 3 were replaced with aluminum nitride particles-D (TFZ-N10P: available from Toyo Aluminium K.K.) having a d50 in cumulative volume of 10 μm and having a specific surface area of 1.1 $m^2/g$ as determined by a BET method.

Example 8

Silica-coated aluminum nitride particles as silicon-containing oxide-coated aluminum nitride particles were prepared as in Example 3 except that the aluminum nitride particles-C used as a raw material in Example 3 were replaced with aluminum nitride particles-E (FAN-f30-A1: available from Furukawa Denshi Co., Ltd.) having a d50 in cumulative volume of 30 μm and having a specific surface area of 0.11 $m^2/g$ as determined by a BET method.

Example 9

Silica-coated aluminum nitride particles as silicon-containing oxide-coated aluminum nitride particles were prepared as in Example 3 except that the aluminum nitride particles-C used as a raw material in Example 3 were replaced with aluminum nitride particles-F (FAN-f80-A1: available from Furukawa Denshi Co., Ltd.) having a d50 in cumulative volume of 80 μm and having a specific surface area of 0.05 $m^2/g$ as determined by a BET method.

Example 10

Silica-coated aluminum nitride particles as silicon-containing oxide-coated aluminum nitride particles were prepared as in Example 3 except that the aluminum nitride particles-C used as a raw material in Example 3 were replaced with aluminum nitride particles-G (TFZ-N01P:

available from Toyo Aluminium K.K.) having a d50 in cumulative volume of 1 μm and having a specific surface area of 3.3 m²/g as determined by a BET method.

Example 11

Aluminum nitride particles coated with a composite oxide of elemental silicon and elemental aluminum were prepared as silicon-containing oxide-coated aluminum nitride particles as in Example 3 except that the conditions of heat treatment in the second step were 800° C. and 3.0 hours.

Example 12

Aluminum nitride particles coated with a composite oxide of elemental silicon and elemental aluminum were prepared as silicon-containing oxide-coated aluminum nitride particles as in Example 3 except that the conditions of heat treatment in the second step were 800° C. and 10.0 hours.

Example 13

Aluminum nitride particles coated with a composite oxide of elemental silicon and elemental aluminum were prepared as silicon-containing oxide-coated aluminum nitride particles as in Example 11 except that the conditions of heat treatment in the second step were 800° C. and 6.0 hours, and after the second step, the first step and the second step were further performed in this order. It is noted that the coating amount of an organic silicone compound after the first step for the first time and the coating amount of an organic silicone compound after the first step for the second time were both 0.67 mg/m².

Example 14

Aluminum nitride particles coated with a composite oxide of elemental silicon and elemental aluminum were prepared as silicon-containing oxide-coated aluminum nitride particles as in Example 3 except that the conditions of heat treatment in the second step were 850° C. and 3.0 hours.

Example 15

Aluminum nitride particles coated with a composite oxide of elemental silicon and elemental aluminum were prepared as silicon-containing oxide-coated aluminum nitride particles as in Example 3 except that the conditions of heat treatment in the second step were 900° C. and 3.0 hours.

Example 16

Aluminum nitride particles coated with a composite oxide of elemental silicon and elemental aluminum were prepared as silicon-containing oxide-coated aluminum nitride particles as in Example 3 except that the conditions of heat treatment in the second step were 950° C. and 3.0 hours.

Comparative Example 4

Aluminum nitride particles coated with a composite oxide of elemental silicon and elemental aluminum were prepared as silicon-containing oxide-coated aluminum nitride particles as in Example 3 except that the conditions of heat treatment in the second step were 1000° C. and 3.0 hours.

Comparative Example 5

Aluminum nitride particles coated with a composite oxide of elemental silicon and elemental aluminum were prepared as silicon-containing oxide-coated aluminum nitride particles as in Example 3 except that the conditions of heat treatment in the second step were 1100° C. and 3.0 hours.

Example 17

Silica-coated aluminum nitride particles as silicon-containing oxide-coated aluminum nitride particles were prepared as in Example 1 except that after the second step, the first step and the second step were further performed twice in this order. It is noted that the coating amount of an organic silicone compound after the first step for the first time and the coating amount of an organic silicone compound after the first step for the second time were both 0.34 mg/m².

[Manufacture of Resin Sheet]

Silicon-containing oxide-coated aluminum nitride particles from Examples 1 to 17, Comparative Examples 1, 4, and 5; aluminum nitride particles from Comparative Examples 2 to 3; a bisphenol A epoxy resin with an epoxy-equivalent of 189 (YD128: available from Nippon Steel & Sumikin Chemical Co., Ltd.) as a resin component; a solution as a high molecular weight component in which 30% by mass of a bisphenol A phenoxy resin having a weight average molecular weight of 40000 in terms of polystyrene (YP50S: available from Nippon Steel & Sumikin Chemical Co., Ltd.) was dissolved in 1-methoxy-2-propanol (solvent); 2-ethyl-4-methylimidazole (2E4MZ: available from Shikoku Chemicals Corporation) as a curing agent were blended in parts by mass as shown in Tables 1 to 4. A resin sheet was obtained in accordance with the following procedures. Preparations from Examples and Comparative Examples were each charged into a planetary centrifugal mixer, and mixtures were prepared under conditions of 2000 rpm and 30 seconds. Next, the mixtures from Examples and Comparative Examples were each separately made into a sheet with a thickness of 450 μm using a coater. Subsequently, a dryer was used to perform drying at 60° C. for 1 hour under ordinary pressure, and then at 60° C. for 10 minutes under reduced pressure. The resulting sheets were then allowed to pass through a constant-velocity hot roll at a temperature of 90° C. They were allowed to pass through three gaps: 450 μm, 400 μm, and 350 μm in the constant-velocity hot roll to achieve a uniform sheet thickness. Finally, hot compression forming was performed for heat curing resin sheets under conditions of 10 MPa, 120° C., and 30 minutes, thereby obtaining cured resin sheets.

It is noted that the content of particles in a resin sheet from each of Examples and Comparative Examples was calculated assuming that the theoretical density of aluminum nitride was 3.26 g/cm³, and the theoretical density of a resin component was 1.17 g/cm³, and the theoretical density of a high molecular weight component was 1.17 g/cm³ and also assuming that the additive property was simply applicable to each component. It is noted that a solvent was assumed to be completely volatilized, and a curing agent, which was in a trace amount, was ignored.

With regard to the aluminum nitride particles used and the silicon-containing oxide-coated aluminum nitride particles obtained from Examples and Comparative Examples, shown in Tables 1 to 4 and FIGS. 2 to 5 were results from [measurement of the coating amount of an organic silicone compound per m² of surface area calculated from the specific surface area (m²/g) of aluminum nitride particles as determined by a BET method], [measurement of the content of carbon atoms in silicon-containing oxide-coated aluminum nitride particles], [measurement of the content of oxygen atoms in silicon-containing oxide-coated aluminum nitride particles], [measurement of the content of silicon atoms in silicon-containing oxide-coated aluminum nitride particles], [measurement of the coverage of a silicon-containing oxide coating covering the surfaces of aluminum nitride particles as determined by LEIS analysis], [measurement of the specific surface area x of silicon-containing oxide-coated aluminum nitride particles as determined by a BET method], [measurement of the Si/Al atom ratio of the surfaces of silicon-containing oxide-coated aluminum nitride particles], [evaluation of the moisture resistance of particles], and [measurement of the thermal conductivity of resin sheets (heat dispersing sheets)]. Further, symbols "O" and "X" shown in the sections "formula (4) and (5)" in Tables 1 to 4 mean a case where the formula (4) and (5) are satisfied and a case where the formula (4) and (5) are not satisfied, respectively.

These results demonstrate that Examples 1 to 17 in which silicon-containing oxide-coated aluminum nitride particles obtained by the method of manufacturing a silicon-containing oxide-coated aluminum nitride particle according to an embodiment of the present invention are used can maintain a high thermal conductivity inherent to aluminum nitride particles, and can also significantly improve the moisture resistance of aluminum nitride particles as compared with Comparative Examples 2 or 3 in which coating treatment with a silicon-containing oxide coating was not performed. With regard to detailed examination of thermal conductivity, in particular in Examples 2 and 4, the thermal conductivity of Examples 2 and 4 in which the aluminum nitride particles of Comparative Example 2 were coated with a silicon-containing oxide coating showed a value as good as nearly 90% of Comparative Example 2 in which coating treatment with a silicon-containing oxide was not performed. Further, in Examples 3, 5, and 6, the thermal conductivity of Examples 3, 5, and 6 in which the aluminum nitride particles of Comparative Example 3 were coated with a silicon-containing oxide coating showed a value as good as 95% or more of Comparative Example 3 which in which coating treatment with a silicon-containing oxide coating was not performed. In Examples, good moisture resistance and high thermal conductivity were able to be achieved simultaneously. This is likely because an effective inorganic coating (a silicon-containing oxide such as a silica coating) was able to be efficiently generated using the minimum amount of an organic silicone compound for use in coating. Further, in Example 6 where the step of performing the first step and the second step in this order was conducted twice, moisture resistance was improved, and thermal conductivity was substantially unchanged, as compared with Example 3 where preparation was performed in the same way except that the above step was conducted only once. Moreover, the thermal conductivity of Example 17 where the formula (4) was not satisfied was decreased as compared with Example 1 where the formula (4) and (5) were satisfied.

Meanwhile, in Comparative Example 1 where treatment up to the first step was performed using the same raw materials and step conditions as in Example 1, and heat treatment in the second step was not performed, the concentration of ammonia was reduced to a poor value by one digit as compared with Example 1. This suggests that moisture resistance may be closely related with the content of carbon atoms for a case of aluminum nitride particles coated with organic silicone. That is, a low content of carbon atoms was resulted from conversation of an organic silicone compound-containing coating into an inorganic silicon-containing oxide. This difference in nature of coatings may be responsible for significantly improved moisture resistance. It is noted that the reason why the concentration of ammonia is lower at 85° C. than at 60° C. in the moisture resistance evaluations of Comparative Examples 2 and 3 although the conditions are severer at 85° C. than at 60° C. may be as follows: a hydrolysis reaction progresses much faster at 85° C. than at 60° C. when a silicon-containing oxide coating is not formed, and thus an oxide coating may be formed immediately after particles are added to aqueous hydrochloric acid, and consequently a hydrolysis reaction in the inner side of that oxide coating may be less promoted at 85° C. than at 60° C.

TABLE 1

| | Items | | Example 1 | Example 2 | Example 3 | Example 4 | Comparative Example 1 | Comparative Example 2 |
|---|---|---|---|---|---|---|---|---|
| Particles | Types of aluminum nitride particles | Aluminum nitride particles-A | ○ | | | | ○ | |
| | | Aluminum nitride particles-B | | ○ | | ○ | | ○ |
| | | Aluminum nitride particles-C | | | ○ | | | |
| | Types of materials for forming silicon-containing oxide coatings | Organic silicone compound-A | ○ | ○ | ○ | | ○ | |
| | | Organic silicone compound-B | | | | ○ | | |
| | Shaking in the first step | | No | No | No | No | No | |
| | Coating amount of organic silicone compound (mg/m²) | | 0.33 | 0.70 | 0.71 | 0.56 | 0.35 | |
| | Heat treatment conditions in the second step | Heat treatment temperature (° C.) | 650 | 650 | 650 | 650 | | |
| | | Heat treatment time (h) | 1.5 | 1.5 | 1.5 | 1.5 | | |
| | Properties | Coverage of silicon-containing oxide coating (%) | 72 | 74 | 75 | 72 | — | — |
| | | Content y of silicon atoms (ppm by mass) | 2550 | 481 | 149 | 136 | 160 | 300 |
| | | Content of carbon atoms (ppm by mass) | 420 | 60 | 80 | 70 | 1260 | 70 |
| | | Content of oxygen atoms (% by mass) | 0.9 | 0.3 | 1.5 | 0.3 | 0.8 | 0.4 |
| | | Si/Al atoms ratio by AES analysis | 1.28 | 1.31 | 1.35 | 1.29 | 1.45 | — |
| | | BET specific surface area x (m²/g) | 2.4 | 0.5 | 0.07 | 0.5 | 2.4 | 0.5 |
| | | Expressions (4) and (5) | ○ | ○ | ○ | ○ | — | — |
| | | Moisture resistance ammonia concentration (mg/L) (60° C.) | 2 | 1 | 1 | 1 | 28 | 83821 |
| | | Moisture resistance ammonia concentration (mg/L) (85° C.) | 3 | 3 | 6 | 5 | 127 | 21784 |

TABLE 1-continued

|  |  | Items | Example 1 | Example 2 | Example 3 | Example 4 | Comparative Example 1 | Comparative Example 2 |
|---|---|---|---|---|---|---|---|---|
| Resin sheets | Composition (parts by mass) | Particles | 100.0 | 100.0 | 100.0 | 100.0 | 100.0 | 100.0 |
|  |  | Epoxy resin | 17.3 | 17.3 | 17.3 | 17.3 | 17.3 | 17.3 |
|  |  | High molecular weight component | 1.9 | 1.9 | 1.9 | 1.9 | 1.9 | 1.9 |
|  |  | Curing agent | 0.1 | 0.1 | 0.1 | 0.1 | 0.1 | 0.1 |
|  |  | Content of particles (vol %) | 65.0 | 65.0 | 65.0 | 65.0 | 65.0 | 65.0 |
|  | Thermal conductivity (W/m/K) |  | 3.4 | 4.7 | 7.6 | 4.9 | 3.3 | 5.3 |

TABLE 2

|  |  | Items | Example 5 | Comparative Example 3 | Example 6 |
|---|---|---|---|---|---|
| Particles | Types of aluminum nitride particles | Aluminum nitride particles-C | ○ | ○ | ○ |
|  | Types of materials for forming silicon-containing oxide coatings | Organic silicone compound-A | ○ |  | ○ |
|  | Shaking in the first step |  | Yes |  | No |
|  | Coating amount of organic silicone compound (mg/m$^2$) |  | 0.69 |  | 0.65 × 2 |
|  | Heat treatment conditions in the second step | Heat treatment temperature (° C.) | 650 |  | 650 |
|  |  | Heat treatment time (h) | 1.5 |  | 1.5 |
|  | Properties | Coverage of silicon-containing oxide coating (%) | 74 | — | 88 |
|  |  | Content y of silicon atoms (ppm by mass) | 149 | 74 | 200 |
|  |  | Content of carbon atoms (ppm by mass) | 90 | 80 | 90 |
|  |  | Content of oxygen atoms (% by mass) | 1.4 | 1.4 | 1.5 |
|  |  | Si/Al atoms ratio by AES analysis | 1.33 | — | 2.24 |
|  |  | BET specific surface area x (m$^2$/g) | 0.07 | 0.07 | 0.07 |
|  |  | Expressions (4) and (5) | ○ | — | ○ |
|  |  | Moisture resistance ammonia concentration (mg/L) (60° C.) | 1 | 28674 | 1 |
|  |  | Moisture resistance ammonia concentration (mg/L) (85° C.) | 2 | 9387 | 1 |
| Resin sheets | Composition (parts by mass) | Particles | 100.0 | 100.0 | 100.0 |
|  |  | Epoxy resin | 17.3 | 17.3 | 17.3 |
|  |  | High molecular weight component | 1.9 | 1.9 | 1.9 |
|  |  | Curing agent | 0.1 | 0.1 | 0.1 |
|  |  | Content of particles (vol %) | 65.0 | 65.0 | 65.0 |
|  | Thermal conductivity (W/m/K) |  | 7.4 | 7.6 | 7.4 |

TABLE 3

|  |  | Items | Example 7 | Example 8 | Example 9 | Example 10 |
|---|---|---|---|---|---|---|
| Particles | Types of aluminum nitride particles | Aluminum nitride particles-A |  |  |  |  |
|  |  | Aluminum nitride particles-B |  |  |  |  |
|  |  | Aluminum nitride partiales-C |  |  |  |  |
|  |  | Aluminum nitride particles-D | ○ |  |  |  |
|  |  | Aluminum nitride particles-E |  | ○ |  |  |
|  |  | Aluminum nitride particles-F |  |  | ○ |  |
|  |  | Aluminum nitride particles-G |  |  |  | ○ |
|  | Types of materials for forming silicon-containing oxide coatings | Organic silicone compound-A | ○ | ○ | ○ | ○ |
|  | Shaking in the first step |  | No | No | No | No |
|  | Coating amount of organic silicone compound (mg/m$^2$) |  | 0.51 | 0.69 | 0.72 | 0.35 |
|  | Heat treatment conditions in the second step | Heat treatment temperature (° C.) | 650 | 650 | 650 | 650 |
|  |  | Heat treatment time (h) | 1.3 | 1.5 | 1.5 | 1.5 |
|  | Properties | Coverage of silicon-containing oxide coating (%) | 74 | 75 | 76 | 73 |
|  |  | Content y of silicon atoms (ppm by mass) | 509 | 151 | 128 | 2500 |
|  |  | Content of carbon atoms (ppm by mass) | 300 | 70 | 100 | 80 |

TABLE 3-continued

| | | Items | Example 7 | Example 8 | Example 9 | Example 10 |
|---|---|---|---|---|---|---|
| | | Content of oxygen atoms (% by mass) | 0.7 | 1.5 | 1.3 | 1.3 |
| | | Si/Al atoms ratio by AES analysis | 1.35 | 1.37 | 1.41 | 1.34 |
| | | BET specific surface area x (m²/g) | 1.1 | 0.11 | 0.05 | 3.3 |
| | | Expressions (4) and (5) | ○ | ○ | ○ | ○ |
| | | Moisture resistance ammonia concentration (mg/L) (60° C.) | 1 | 4 | 3 | 3 |
| | | Moisture resistance ammonia concentration (mg/L) (85° C.) | 3 | 6 | 8 | 4 |
| Resin sheets | Composition (parts by mass) | Particles | 100 | 100 | 100 | 100 |
| | | Epoxy resin | 17.3 | 17.3 | 17.3 | 17.3 |
| | | High molecular weight component | 1.9 | 1.9 | 1.9 | 1.9 |
| | | Curing agent | 0.1 | 0.1 | 0.1 | 0.1 |
| | | Content of particles (vol %) | 65 | 65 | 65 | 65 |
| | Thermal conductivity (W/m/K) | | 4.2 | 6.4 | 8.5 | 2.8 |

TABLE 4

| | | | Example | | | | |
|---|---|---|---|---|---|---|---|
| | | Items | 11 | 12 | 13 | 14 | 15 |
| Particles | Types of aluminum nitride particles | Aluminum nitride particles-A | | | | | |
| | | Aluminum nitride particles-C | ○ | ○ | ○ | ○ | ○ |
| | Types of materials for forming silicon-containing oxide coatings | Organic silicone compound-A | ○ | ○ | ○ | ○ | ○ |
| | Shaking in the first step | | No | No | No | No | No |
| | Coating amount of organic silicone compound (mg/m²) | | 0.69 | 0.71 | 0.67 × 2 | 0.69 | 0.71 |
| | Heat treatment conditions in the second step | Heat treatment temperature (° C.) | 800 | 800 | 800 | 850 | 900 |
| | | Heat treatment time (h) | 3.0 | 10.0 | 6.0 | 3.0 | 3.0 |
| | Properties | Coverage of silicon-containing oxide coating (%) | 32 | 39 | 85 | 29 | 27 |
| | | Content y of silicon atoms (ppm by mass) | 130 | 145 | 225 | 136 | 141 |
| | | Content of carbon atoms (ppm by mass) | 90 | 90 | 80 | 90 | 110 |
| | | Content of oxygen atoms (% by mass) | 1.4 | 1.4 | 1.4 | 1.5 | 1.5 |
| | | Si/Al atoms ratio by AES analysis | 1.04 | 0.89 | 2.17 | 0.75 | 0.57 |
| | | BET specific surface area (m²/g) | 0.07 | 0.07 | 0.07 | 0.07 | 0.07 |
| | | Expressions (4) and (5) | ○ | ○ | ○ | ○ | ○ |
| | | Moisture resistance ammonia concentration (mg/L) (60° C.) | 2 | 1 | 1 | 1 | 1 |
| | | Moisture resistance ammonia concentration (mg/L) (85° C.) | 7 | 3 | 2 | 3 | 1 |
| Resin sheets | Composition (parts by mass) | Particles | 100.0 | 100.0 | 100.0 | 100.0 | 100.0 |
| | | Epoxy resin | 17.3 | 17.3 | 17.3 | 17.3 | 17.3 |
| | | High molecular weight component | 1.9 | 1.9 | 1.9 | 1.9 | 1.9 |
| | | Curing agent | 0.1 | 0.1 | 0.1 | 0.1 | 0.1 |
| | | Content of particles (vol %) | 65.0 | 65.0 | 65.0 | 65.0 | 65.0 |
| | Thermal conductivity (W/m/K) | | 9.9 | 9.9 | 9.8 | 9.8 | 9.6 |

| | | | Example | Comparative Example | | Example |
|---|---|---|---|---|---|---|
| | | Items | 16 | 4 | 5 | 17 |
| Particles | Types of aluminum nitride particles | Aluminum nitride particles-A | | | | ○ |
| | | Aluminum nitride particles-C | ○ | ○ | ○ | |
| | Types of materials for forming silicon-containing oxide coatings | Organic silicone compound-A | ○ | ○ | ○ | ○ |
| | Shaking in the first step | | No | No | No | No |
| | Coating amount of organic silicone compound (mg/m²) | | 0.67 | 0.68 | 0.69 | 0.34 × 3 |
| | Heat treatment conditions in the second step | Heat treatment temperature (° C.) | 950 | 1000 | 1100 | 650 |
| | | Heat treatment time (h) | 3.0 | 3.0 | 3.0 | 1.5 |
| | Properties | Coverage of silicon-containing oxide coating (%) | 15 | 9 | 8 | 83 |
| | | Content y of silicon atoms (ppm by mass) | 131 | 158 | 157 | 4760 |
| | | Content of carbon atoms (ppm by mass) | 110 | 110 | 120 | 410 |
| | | Content of oxygen atoms (% by mass) | 1.5 | 1.7 | 3.9 | 2.4 |
| | | Si/Al atoms ratio by AES analysis | 0.33 | 0.20 | 0.16 | 2.49 |
| | | BET specific surface area (m²/g) | 0.07 | 0.07 | 0.07 | 3.98 |
| | | Expressions (4) and (5) | ○ | — | — | X |

TABLE 4-continued

|  |  |  | | | | |
|---|---|---|---|---|---|---|
|  |  | Moisture resistance ammonia concentration (mg/L) (60° C.) | 2 | 4 | 13 | 1 |
|  |  | Moisture resistance ammonia concentration (mg/L) (85° C.) | 5 | 171 | 316 | 3 |
| Resin sheets | Composition (parts by mass) | Particles | 100.0 | 100.0 | 100.0 | 100.0 |
|  |  | Epoxy resin | 17.3 | 17.3 | 17.3 | 17.3 |
|  |  | High molecular weight component | 1.9 | 1.9 | 1.9 | 1.9 |
|  |  | Curing agent | 0.1 | 0.1 | 0.1 | 0.1 |
|  |  | Content of particles (vol %) | 65.0 | 65.0 | 65.0 | 65.0 |
|  | Thermal conductivity (W/m/K) |  | 9.1 | 8.2 | 7.6 | 2.8 |

The invention claimed is:

1. A silicon-containing oxide-coated aluminum nitride particle including an aluminum nitride particle and a silicon-containing oxide coating covering the surface of the aluminum nitride particle, wherein
the content of carbon atoms is less than 1000 ppm by mass,
the coverage of the silicon-containing oxide coating covering the surface of the aluminum nitride particle as measured by LEIS analysis is 15% or more and 100% or less, and
the silicon-containing oxide-coated aluminum nitride particle satisfies the following formula (4) wherein x represents the specific surface area ($m^2/g$) of a silicon-containing oxide-coated aluminum nitride particle as determined by a BET method, and y represents the content of silicon atoms (ppm by mass) in a silicon-containing oxide-coated aluminum nitride particle, $$y \leq 1000x + 500 \qquad (4).$$

2. The silicon-containing oxide-coated aluminum nitride particle according to claim 1, wherein the coverage of the silicon-containing oxide coating covering the surface of the aluminum nitride particle as determined by LEIS analysis is 15% or more and 40% or less.

3. The silicon-containing oxide-coated aluminum nitride particle according to claim 1, wherein the content of carbon atoms is 50 ppm by mass or more.

4. The silicon-containing oxide-coated aluminum nitride particle according to claim 1,
wherein the concentration of ammonia eluted into aqueous hydrochloric acid is 10 mg/L or less when 3 g of the silicon-containing oxide-coated aluminum nitride particle is immersed in 17 g of aqueous hydrochloric acid adjusted to pH 4 at 85° C. for 2 hours.

* * * * *